US007361086B2

(12) United States Patent
Gazdic et al.

(10) Patent No.: US 7,361,086 B2
(45) Date of Patent: Apr. 22, 2008

(54) GAMING MACHINE WITH SIMULATED AI FEATURE

(75) Inventors: Daniel J. Gazdic, Chicago, IL (US); Jeremy M. Hornik, Chicago, IL (US); Michael W. Mastropietro, Chicago, IL (US)

(73) Assignee: WMS Gaming, Inc., Waukegan, IL (US)

(*) Notice: Subject to any disclaimer, the term of this patent is extended or adjusted under 35 U.S.C. 154(b) by 633 days.

(21) Appl. No.: 10/650,004

(22) Filed: Aug. 27, 2003

(65) Prior Publication Data

US 2005/0049029 A1 Mar. 3, 2005

(51) Int. Cl.

| | |
|---|---|
| ***A63F 9/00*** | (2006.01) |
| ***A63F 13/00*** | (2006.01) |
| ***G06F 17/00*** | (2006.01) |
| ***G06F 19/00*** | (2006.01) |

(52) U.S. Cl. ............................ 463/16; 463/20; 463/30; 273/138.1

(58) Field of Classification Search .................... 463/9, 463/30–34, 16–20, 1; 273/138.1

See application file for complete search history.

(56) References Cited

U.S. PATENT DOCUMENTS

| | | | | |
|---|---|---|---|---|
| 6,050,895 | A * | 4/2000 | Luciano et al. | 463/7 |
| 6,190,255 | B1 | 2/2001 | Thomas et al. | 463/20 |
| 6,315,660 | B1 | 11/2001 | DeMar et al. | 463/16 |
| 6,358,147 | B1 | 3/2002 | Jaffe et al. | 463/20 |
| 6,428,412 | B1 * | 8/2002 | Anderson et al. | 463/9 |
| 6,443,837 | B1 | 9/2002 | Jaffe et al. | 463/16 |
| 6,485,367 | B1 | 11/2002 | Joshi | 463/13 |
| 6,517,432 | B1 * | 2/2003 | Jaffe | 463/16 |
| 6,520,855 | B2 * | 2/2003 | DeMar et al. | 463/20 |
| 6,551,187 | B1 | 4/2003 | Jaffe | 463/20 |
| 6,554,704 | B2 | 4/2003 | Nicastro et al. | 463/20 |
| 6,592,457 | B1 | 7/2003 | Frohm et al. | 463/16 |
| 6,666,766 | B2 * | 12/2003 | Baerlocher et al. | 463/16 |
| 6,786,818 | B1 * | 9/2004 | Rothschild et al. | 463/20 |
| 6,988,947 | B2 * | 1/2006 | Baerlocher et al. | 463/20 |
| 7,115,033 | B1 * | 10/2006 | Timperley | 463/20 |

(Continued)

FOREIGN PATENT DOCUMENTS

WO WO 0032286 A1 * 6/2000

OTHER PUBLICATIONS

Bentley, Tom.,"The Sims Manual."2000.*

(Continued)

*Primary Examiner*—John M. Hotaling, II
*Assistant Examiner*—Meagan Thomasson
(74) *Attorney, Agent, or Firm*—Nixon Peabody, LLP.

(57) ABSTRACT

A method and apparatus for conducting a wagering game are disclosed. A value input device receives a wager from a player to play the wagering game. A processor is operative to define a plurality of possible destinations; define a plurality of possible different movement patterns for moving the objects to the destinations; and for a given one of the objects, assign probabilities to the respective possible movement patterns and select one of the possible movement patterns based on the assigned probabilities. A display depicts the object going to a selected one of the destinations in accordance with the assigned movement pattern. The assigned probabilities for the given object may, for example, depend upon the destination that is selected.

31 Claims, 24 Drawing Sheets

U.S. PATENT DOCUMENTS

| | | | | |
|---|---|---|---|---|
| 2002/0016200 | A1* | 2/2002 | Baerlocher et al. | 463/20 |
| 2003/0008701 | A1* | 1/2003 | Suzuki | 463/16 |
| 2003/0045346 | A1* | 3/2003 | Watanabe | 463/20 |
| 2004/0176156 | A1* | 9/2004 | Walker et al. | 463/16 |
| 2004/0180711 | A1* | 9/2004 | Seelig et al. | 463/16 |

OTHER PUBLICATIONS

Barba, Rick. "The Sims Strategy Guide." Prima Strategy Guides. 2000.*

* cited by examiner

GAMING MACHINE WITH SIMULATED AI FEATURE

FIELD OF THE INVENTION

The present invention relates generally to gaming machines and, more particularly, to a gaming machine with a simulated artificial intelligence (AI) feature.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Shrewd operators consequently strive to employ the most entertaining and exciting machines available because such machines attract frequent and extended play and hence increase profitability to the operator. Accordingly, in the competitive gaming machine industry, there is a continuing need for gaming machine manufacturers to produce new types of games, or enhancements to existing games, which will attract frequent and extended play by enhancing the entertainment value and excitement associated with the game.

SUMMARY OF THE INVENTION

A gaming apparatus for conducting a wagering game includes a value input device, a processor, and a display. The value input device receives a wager from a player to play the wagering game.

In accordance with one aspect of the present invention, the processor is operative to define a plurality of possible destinations; define a plurality of possible different movement patterns for moving the objects to the destinations; and for a given one of the objects, assign probabilities to the respective possible movement patterns and select one of the possible movement patterns based on the assigned probabilities. The display depicts the object going to a selected one of the destinations in accordance with the assigned movement pattern. The assigned probabilities for the given object may, for example, depend upon the destination that is selected.

In accordance with another aspect of the present invention, the processor is operative to define a plurality of movable objects that are ostensibly similar, and assign different behavior types to the respective objects such that the objects behave differently from each other. Each behavior type includes a plurality of behaviors. For each object, the display depicts the plurality of behaviors associated with the behavior type assigned to the given object.

Methods of conducting a wagering game are also disclosed.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The foregoing and other advantages of the invention will become apparent upon reading the following detailed description and upon reference to the drawings in which.

Figure 1:
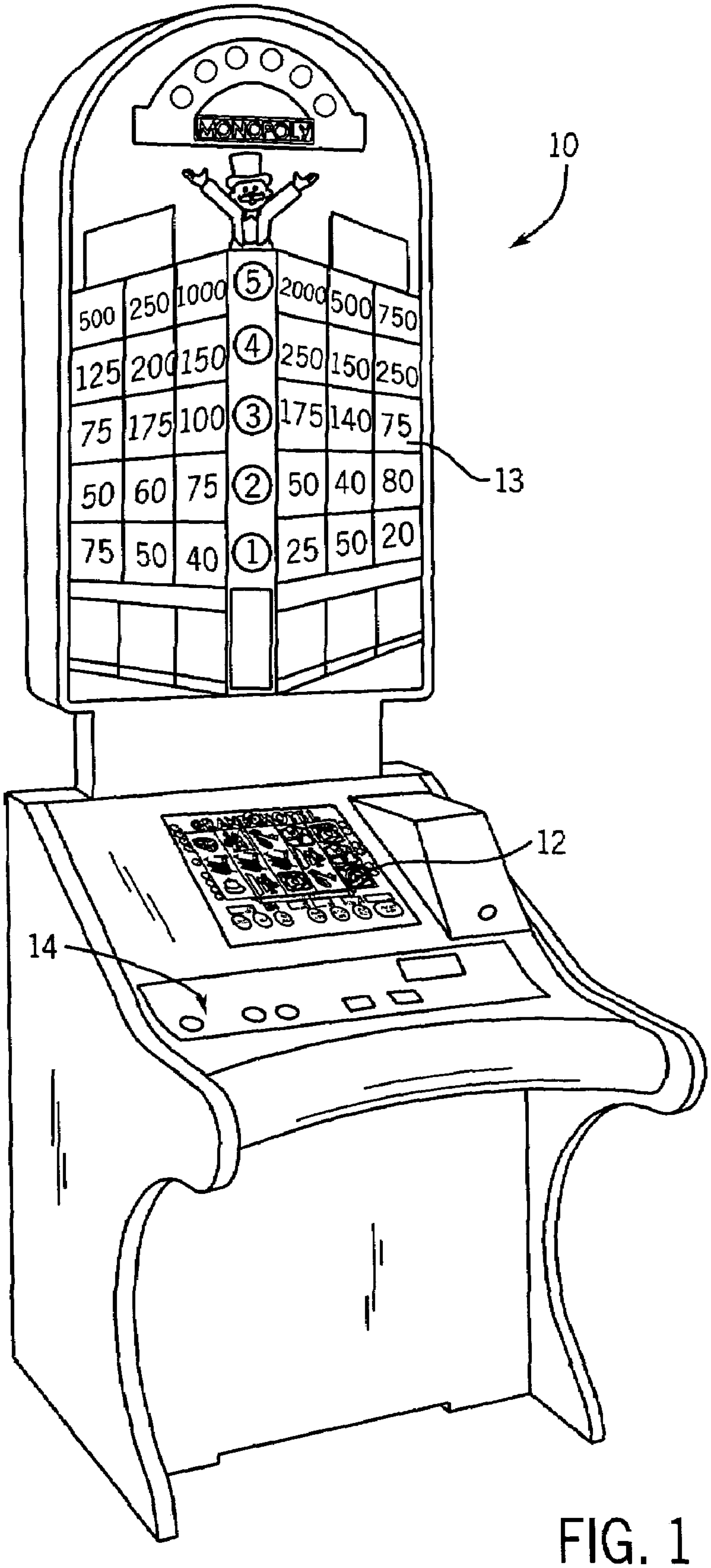
FIG. 1 is a perspective view of a gaming machine embodying the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

Turning now to the drawings and referring initially to FIG. 1, a gaming machine 10 is operable to play a wagering game. The wagering game includes a basic video reel slot game and a simulated AI feature triggered by a start-feature outcome in the basic game. In addition to the simulated AI feature, the basic slot game may produce certain outcomes for triggering other special features and bonus games.

The gaming machine 10 includes a primary visual display 12 preferably in the form of a cathode ray tube (CRT), liquid crystal display (LCD), plasma, or other type of video display known in the art. The display 12 preferably includes a touch screen overlaying the monitor. In the illustrated embodiment, the gaming machine 10 is a “slant-top” version in which the display 12 is slanted at about a thirty-degree angle toward the player of the gaming machine 10. Alternatively, the gaming machine may be an “upright” version in which the display 12 is oriented vertically relative to the player. In addition to the primary display 12, the gaming machine may include a top box display 13 for depicting certain special features and bonus games.

Figure 2:
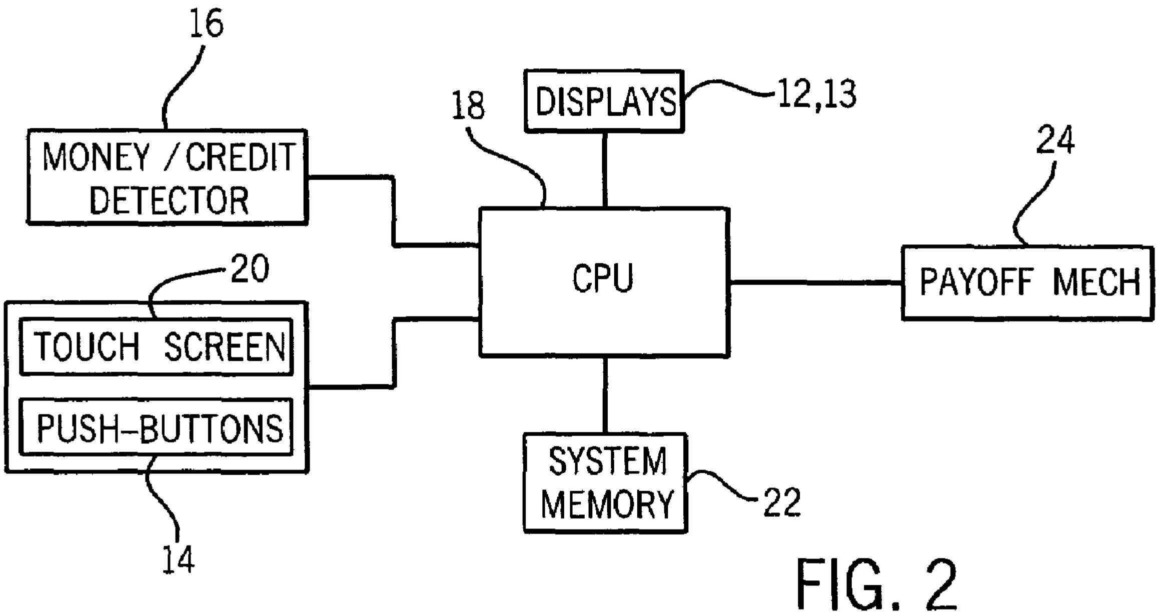
FIG. 2 is a block diagram of a control system suitable for operating the gaming machine.

FIG. 2 is a block diagram of a control system suitable for operating the gaming machine 10. Money/credit detector 16 signals a central processing unit (“CPU”) 18 when a player has inserted money or played a number of credits. The money may be provided by coins, bills, tickets, coupons, cards, etc. Then, the CPU 18 operates to execute a game program that causes the display 12 to display five simulated symbol-bearing reels. The player may select a number of pay lines to play, select an amount to wager on the selected lines, and start game play via the touch screen 20 or the push-buttons 14, causing the CPU 18 to set the reels in motion, randomly select a game outcome, and then stop the reels to display symbols corresponding to the pre-selected game outcome. In accordance with the present invention, a predetermined start-feature outcome in the basic slot game triggers a simulated AI feature.

A system memory 22 stores control software, operational instructions and data associated with the gaming machine 10. In one embodiment, the system memory 22 comprises a separate read-only memory (ROM) and battery-backed random-access memory (RAM). However, it will be appreciated that the system memory 22 may be implemented on any of several alternative types of memory structures or may be implemented on a single memory structure. A payoff mechanism 24 is operable in response to instructions from the CPU 18 to award a payoff to the player in response to certain winning outcomes that might occur in the basic game or the simulated AI feature. The payoff may be provided in the form of coins, bills, tickets, coupons, cards, etc. The payoff amounts are determined by one or more pay tables stored in the system memory 22.

Figure 3:
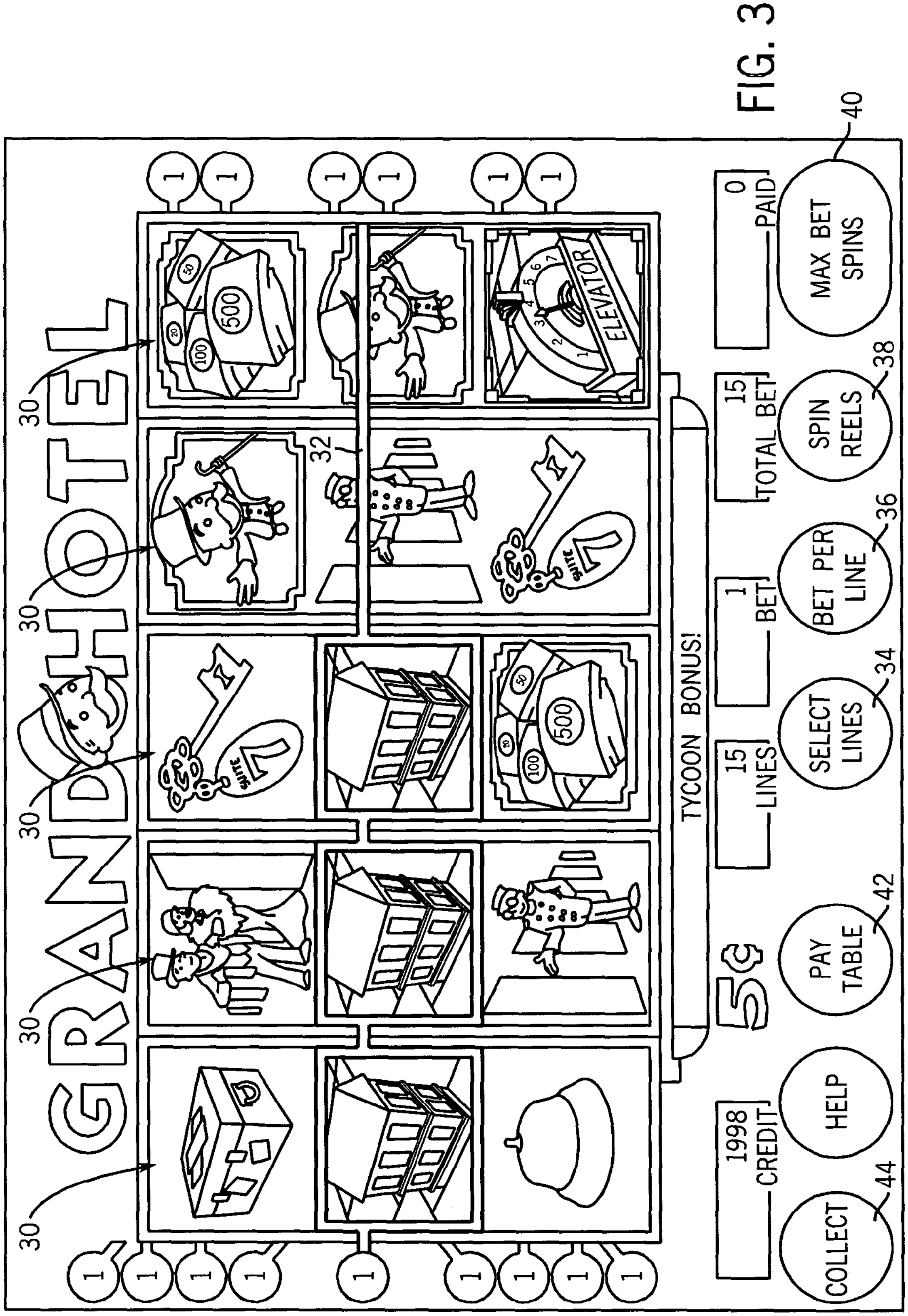
FIG. 3 is a display image associated with a basic slot game and showing a symbol combination for triggering a simulated AI feature.

In one embodiment, the gaming machine 10 is operable to play a game entitled MONOPOLY Grand Hotel™ (MONOPOLY is a trademark of Hasbro, Inc. for its property trading game and equipment). Referring to FIG. 3, a basic video slot game is implemented on the display 12 on simulated reels 30 that are rotated and stopped to place symbols on the reels 30 in visual association with a number of pay lines 32. In the illustrated example, the number of reels 30 is five and the number of pay lines 32 is fifteen. The number of reels and pay lines may, however, be varied to be more or less than the number illustrated. Also, the video display 12 may be replaced with a mechanical display including a number of physical reels driven by stepper motors. Each of the pay lines 32 extends through one symbol on each of the reels 30.

Generally, game play is initiated by inserting money or playing a number of credits, causing the CPU to activate a number of pay lines corresponding to the amount of money or number of credits played. In one embodiment, the player selects the number of pay lines (between one and fifteen) to play by pressing a "Select Lines" key 34. The player then chooses the number of coins or credits to wager on the selected pay lines by pressing a "Bet Per Line" key 36. After selecting a number of pay lines and a wager amount, the reels 30 may be set in motion by touching a "Spin Reels" key 38 or, if the player wishes to bet the maximum amount per line, by using a "Max Bet Spin" key 40. Alternatively, other mechanisms such as a lever or push button may be used to set the reels in motion.

The CPU uses a random number generator to select a game outcome (e.g., "basic" game outcome) corresponding to a particular set of reel "stop positions." The CPU then causes each of the video reels 30 to stop at the appropriate stop position. Video symbols are displayed on the reels 30 to graphically illustrate the reel stop positions and indicate whether the stop positions of the reels represent a winning game outcome.

A pay table identifies winning basic game outcomes (e.g., symbol combinations resulting in an award of credits or a bonus game) and the awards associated with such outcomes. In one embodiment, the pay table is affixed to the machine 10 and/or displayed by the video display 12 in response to a command by the player (e.g., by pressing a "Pay Table" button 42). A winning basic game outcome occurs when the symbols appearing on the reels 30 along an active pay line correspond to one of the winning combinations on the pay table. A winning combination, for example, could be three or more matching symbols along an active pay line, where the award is greater as the number of matching symbols along the active pay line increases. If the displayed symbols stop in a winning combination, the game provides the award identified in the pay table for that combination. If the award is a number of credits, the game typically multiplies that number of credits by the number of credits wagered on the winning pay line. In the illustrated example, relevant portions of the pay table screens and instructional text appear below:

| | |
|---|---|
| Page 1 | |
| Winning line pay combinations pay left to right only. | |
| <logo> is wild for all symbols except <hotel><elevator><going up> | |
| <logo> <logo> <logo> <logo> <logo> | 10,000 |
| <logo> <logo> <logo> <logo> | 1,000 |
| <logo> <logo> <logo> | 100 |
| <logo> <logo> | 10 |
| <mr. m> <mr. m> <mr. m> <mr. m> <mr. m> | 1,000 |
| <mr. m> <mr. m> <mr. m> <mr. m> | 200 |
| <mr. m> <mr. m> <mr. m> | 50 |
| <mr. m> <mr. m> | 5 |
| <money> <money> <money> <money> <money> | 250 |
| <money> <money> <money> <money> | 75 |
| <money> <money> <money> | 25 |
| Page 2 | |
| Winning line pay combinations pay left to right only. | |
| <logo> is wild for all symbols except <hotel><elevator><going up> | |
| <rich cpl.> <rich cpl.> <rich cpl.> <rich cpl.> <rich cpl.> | 250 |
| <rich cpl.> <rich cpl.> <rich cpl.> <rich cpl.> | 75 |
| <rich cpl.> <rich cpl.> <rich cpl.> | 25 |
| <bellhop><bellhop><bellhop><bellhop><bellhop> | 150 |
| <bellhop><bellhop><bellhop><bellhop> | 25 |
| <bellhop><bellhop><bellhop> | 10 |
| Page 3 | |
| Winning line pay combinations pay left to right only. | |
| <logo> is wild for all symbols except <hotel><elevator><going up> | |
| <bell><bell><bell><bell><bell> | 150 |
| <bell><bell><bell><bell> | 25 |
| <bell><bell><bell> | 10 |
| <key><key><key><key><key> | 100 |
| <key><key><key><key> | 20 |
| <key><key><key> | 5 |
| <trunk><trunk><trunk><trunk><trunk> | 100 |
| <trunk><trunk><trunk><trunk> | 20 |
| <trunk><trunk><trunk> | 5 |
| Page 4 | |
| Winning line pay combinations pay left to right only. | |
| <logo> is wild for all symbols except <hotel><elevator><going up> | |
| <hotel><hotel><hotel><hotel><hotel> | 250 + bonus |
| <hotel><hotel><hotel><hotel> | 50 + bonus |
| <hotel><hotel><hotel> | bonus |
| <goingup><goingup><goingup><goingup><goingup> | 250 + hotel room |
| <goingup><goingup><goingup><goingup> | 50 + hotel room |
| <goingup><goingup><goingup> | hotel room |

Wins from the left must occur on adjacent reels, beginning with the leftmost reel.

Only highest winner paid per winning combination.

All line pays are multiplied by the line bet.

Page 5

Tycoon Bonus

Winning combinations of 3 or more <hotels> on an active payline trigger the TYCOON bonus.

Pick a railroad to reveal the number of hotel guests awarded. Then pick 5 property cards. Each property receives a hotel. If all properties in a color group are selected, the potential value of hotels on those properties doubles.

Guests start going to properties. A guest going to a color property awards that property value. A guest going to a property with a hotel awards a hotel value. A rich couple going to a hotel awards triple the hotel value.

The other squares have special awards.

A guest that goes to Go awards all hotel values.

A guest that goes to a Railroad awards 3 to 5 additional guests.

A guest that goes to Free Parking or Waterworks makes 4 cards appear. The card picked awards a credit amount.

- A guest that goes to Chance makes 4 Chance cards appear. The card picked awards one of the properties with hotels at a 2×, 3×, or 4× multiplier.
- A guest that goes to Community Chest makes 4 Community Chest cards appear. The card picked awards a hotel room on a given floor. The hotel room lights on that floor will light up and go out one by one, until only one is left. That room is awarded. If the card picked awards a hotel room on any floor, all the hotel room lights will light up and go out one by one, until only one is left. That hotel room is awarded.
- A guest that goes to the Electric Company awards a hotel room. All the hotel room lights will light up and go out one by one, until only one is left. That hotel room is awarded.

When all guests have gone to properties, the bonus is over.

All awards appearing in the TYCOON bonus have already been multiplied by the line bet.

Page 6

Awards appearing in Tycoon Bonus:

| Color | Base Value | Hotel Value | Monopoly |
|---|---|---|---|
| Purple | 3 | 5 | 10 |
| Light Blue | 3 | 7 | 14 |
| Magenta | 5 | 10 | 20 |
| Orange | 5 | 12 | 24 |
| Red | 7 | 15 | 30 |
| Yellow | 7 | 18 | 36 |
| Green | 10 | 20 | 40 |
| Dark Blue | 15 | 30 | 60 |
| Railroad | 3, 4 or 5 extra guests | | |
| Electric Company | 20-2000 | | |
| Free Parking | 25-250 | | |
| Water Works | 25-150 | | |
| Chance multiplier | 2, 3, 4 | | |
| Community Chest | 20-2000 | | |

All awards appearing in the TYCOON bonus have already been multiplied by the line bet.

The player may collect the amount of accumulated credits by pressing a "Collect" button 44. In the illustrated example, the winning combinations start from the leftmost reel and span adjacent reels, i.e., winning line pay combinations pay left to right only. In an alternative implementation, the winning combinations start from either the leftmost reel or the rightmost reel and span adjacent reels, i.e., winning line pay combinations pay left to right and right to left.

Included among the plurality of basic game outcomes are start-feature outcomes for triggering play of different special game features. The special game features may, for example, include the simulated AI feature and other bonus games. A start-feature outcome may be defined in any number of ways. For example, a start-feature outcome occurs when a special start-feature symbol or a special combination of symbols appears on one or more of the reels 30. The start-feature outcome may require the combination of symbols to appear along an active pay line, or may alternatively require that the combination of symbols appear anywhere on the display (i.e., "scattered") regardless of whether the symbols are along an active pay line. The appearance of a start-feature outcome causes the CPU to shift operation from the basic game to the associated special game feature. In the illustrated example, a combination of three or more Hotel symbols 46 along an active pay line 32 triggers a simulated AI feature that, in the MONOPOLY Grand Hotel game, is called the Tycoon Bonus. The Hotel symbols 46 in the combination may, for example, be highlighted using a flashing border.

FIGS. 4 through 24 are display images associated with the Tycoon Bonus. The display images are preferably depicted on the primary display 12 but may alternatively be depicted on a secondary video display (not shown).

Figure 4:
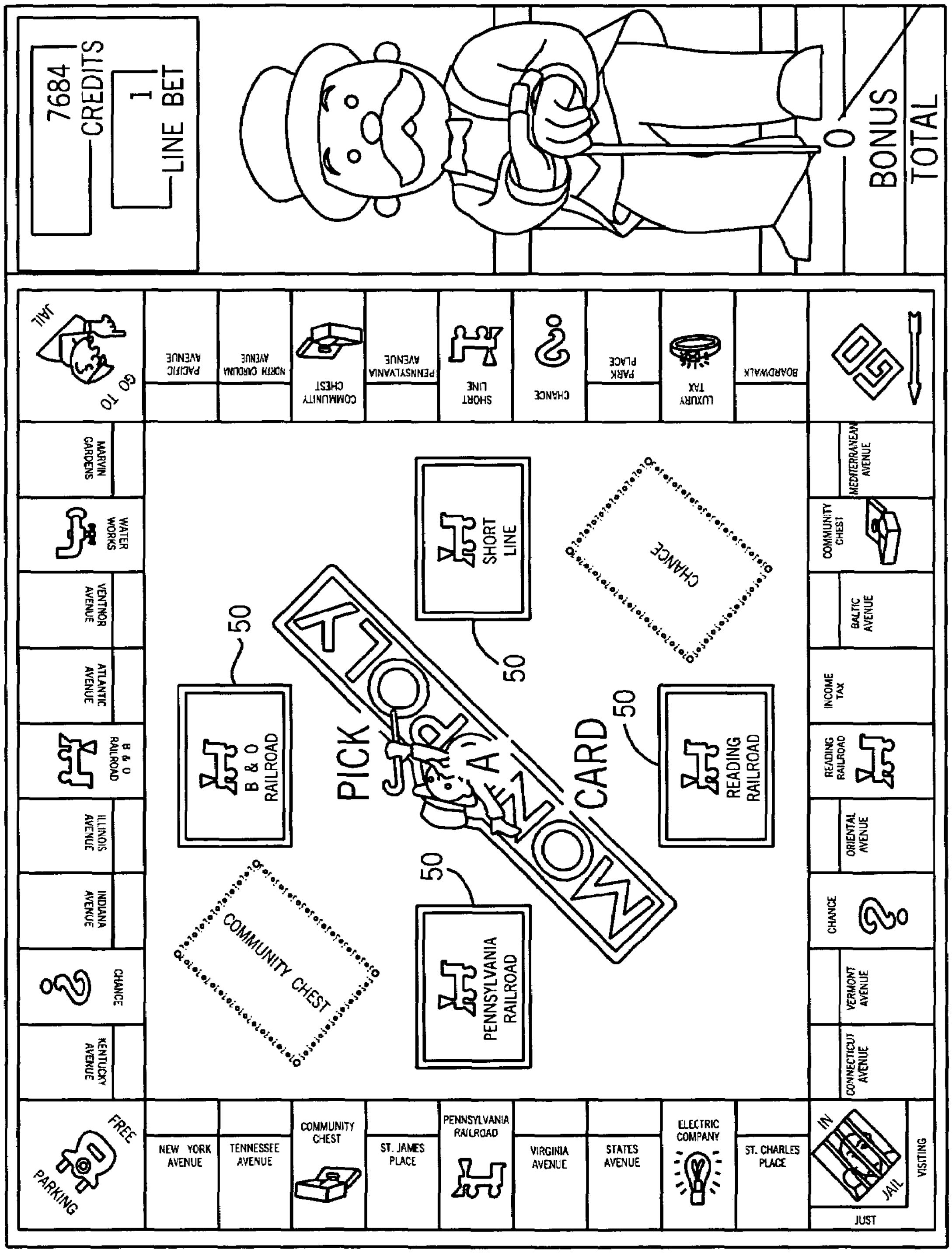
FIGS. 4 through 24 are display images associated with the simulated AI feature.

Referring to FIG. 4, the player is prompted to select one of four railroad cards 50 to reveal a number of hotel guests. The number of hotel guests may, for example, vary between eight and sixteen guests. The CPU may randomly select the number of hotel guests to be associated with the respective cards 50 from a weighted or unweighted table.

Figure 5:
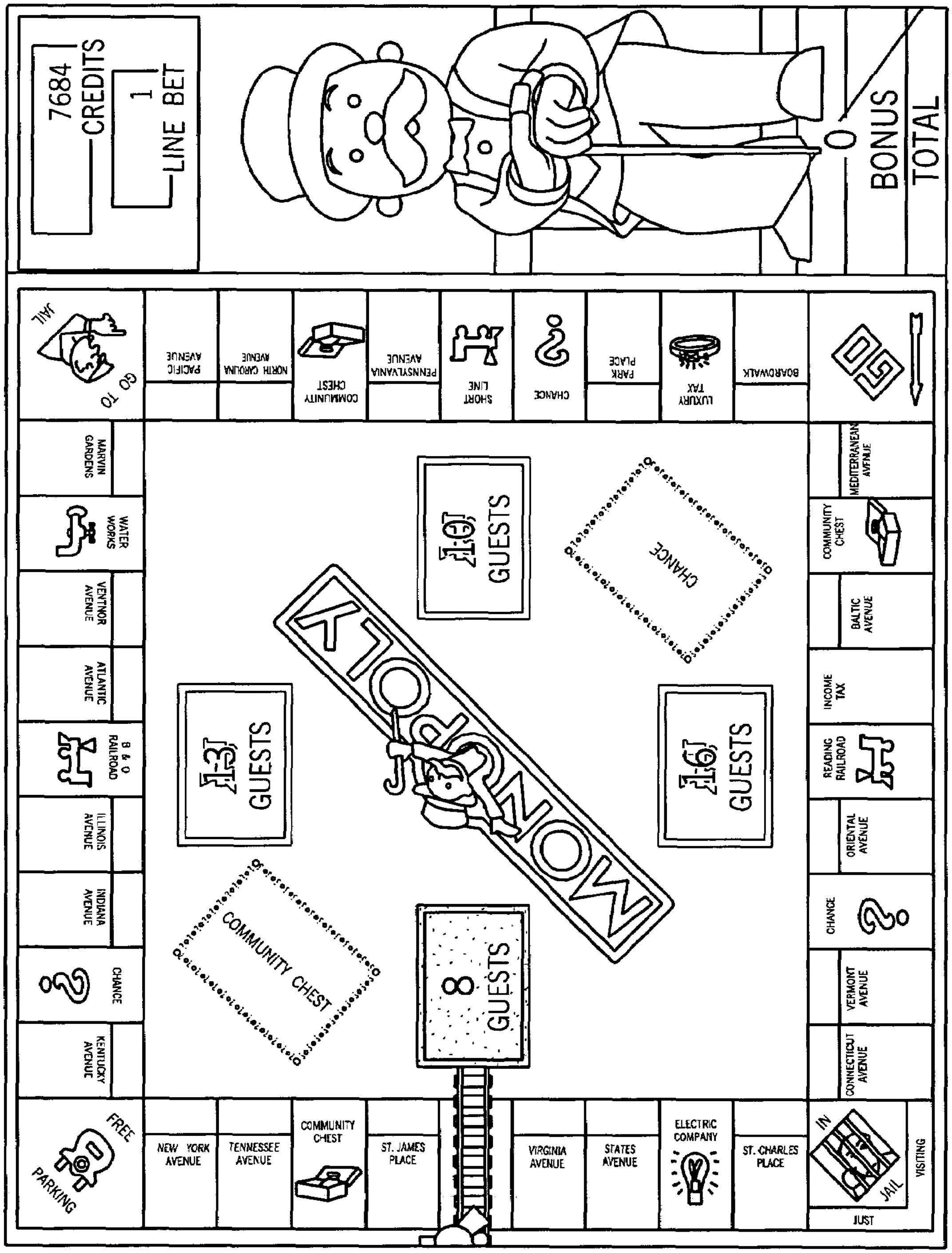

Referring to FIG. 5, the selected card 50 reveals a number of hotel guests. In the illustrated example, the selected card 50 reveals eight guests. After the player selects one of the cards 50, the unselected cards also reveal the number of guests that they would have awarded had the player selected one of those cards. The selected number of guests then enter and stand in the middle of the Monopoly game board 54.

Figure 6:
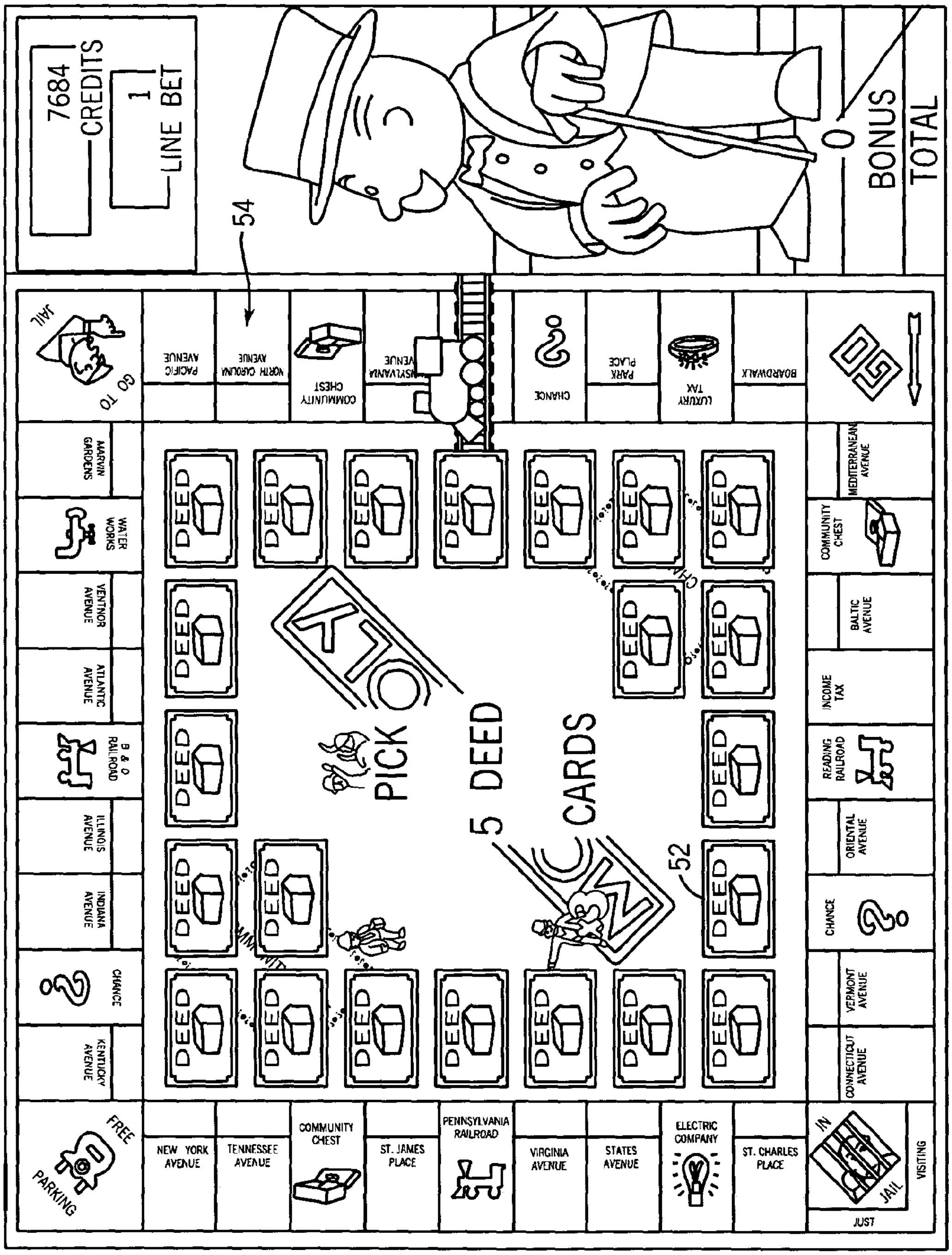

Referring to FIG. 6, the player is prompted to select five of the property deeds 52. Each of the property deeds 52 is initially face down and represents a respective one of the colored properties of the game board 54. Prior to the player's selections, the CPU randomly assigns the colored properties to the property deeds 52 so that the player cannot predict which properties are "hidden" behind which deeds 52.

Figure 7:
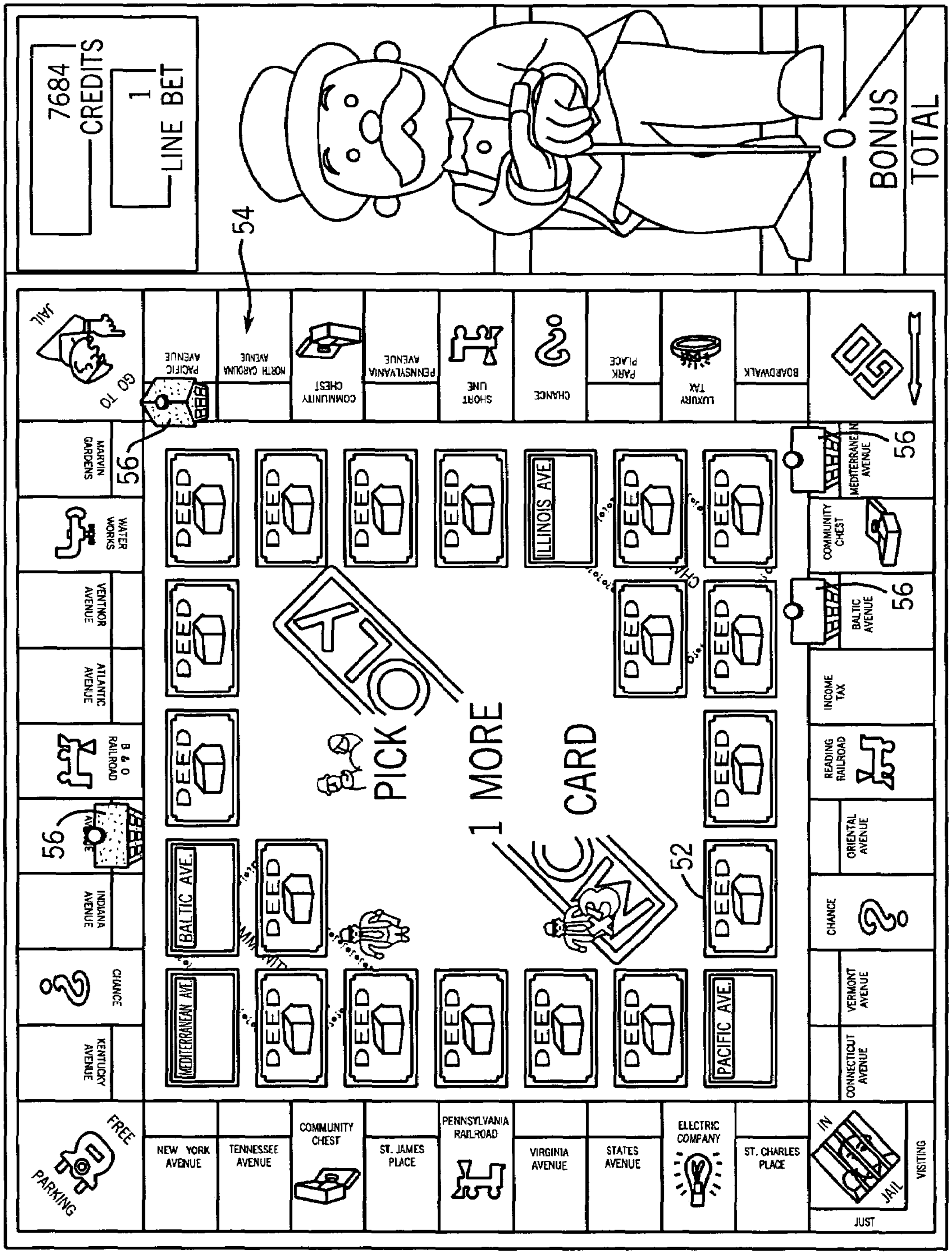
Figure 8:
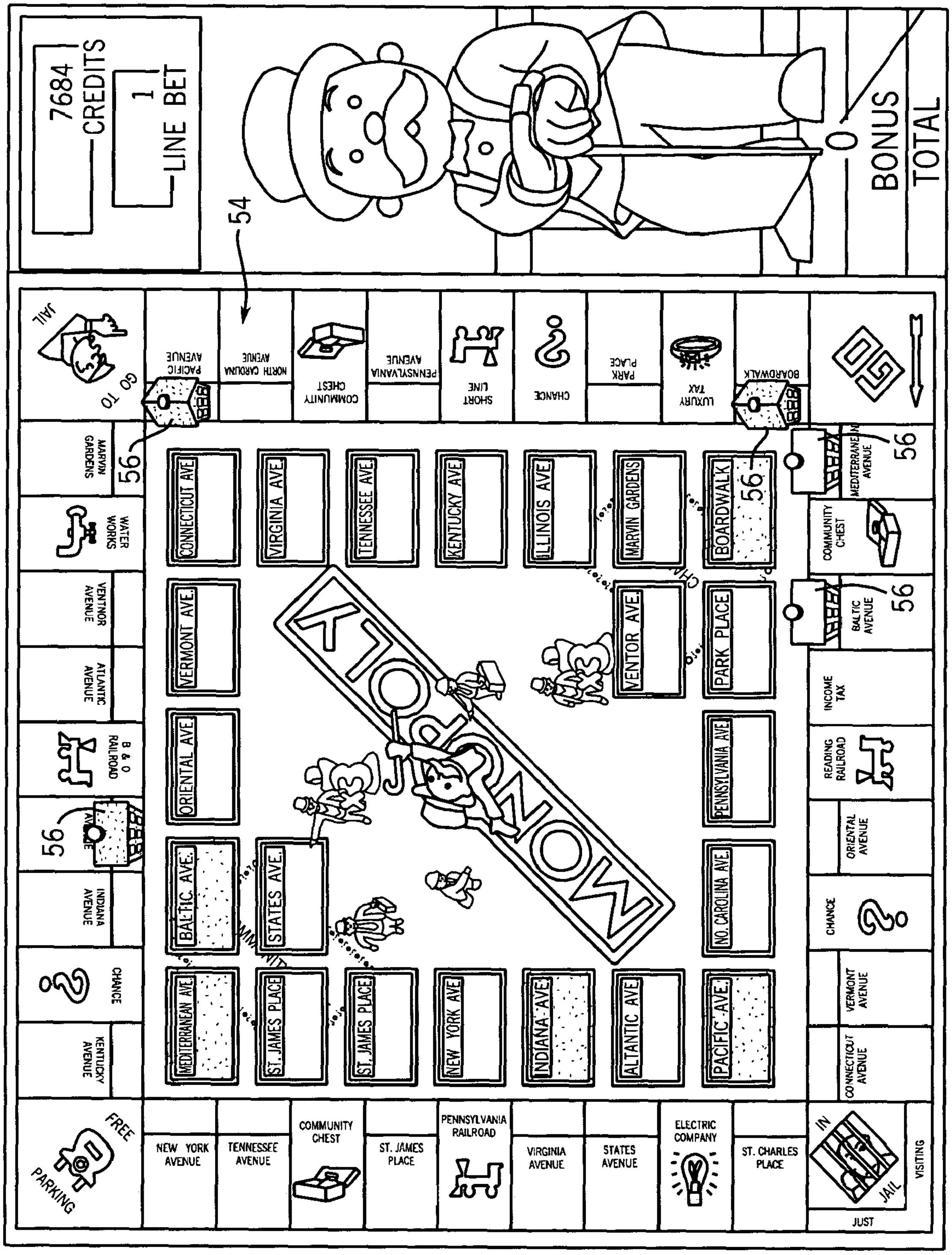

Referring to FIGS. 7 and 8, as the property deeds 52 are selected, each selected property deed 52 reveals a respective colored property. Each revealed property receives a hotel 56. If all the properties in a color group are selected, the potential value of the hotels on those properties is multiplied by a multiplier such as two. In the illustrated example, the selected property deeds 52 reveal the following properties: Mediterranean Avenue, Baltic Avenue, Illinois Avenue, Pacific Avenue, and Boardwalk. Because Mediterranean Avenue and Baltic Avenue are all the properties in the purple color group, the potential value of the hotels on these two properties is doubled. To represent their higher value, the hotels on Mediterranean Avenue and Baltic Avenue are distinguished in some way, such as by enlarging, highlighting, or marking the hotels. After the player selects five of the property deeds 52, the unselected deeds also reveal the colored properties that they would have awarded had the player selected those deeds. The property deeds then vanish.

Figure 9:
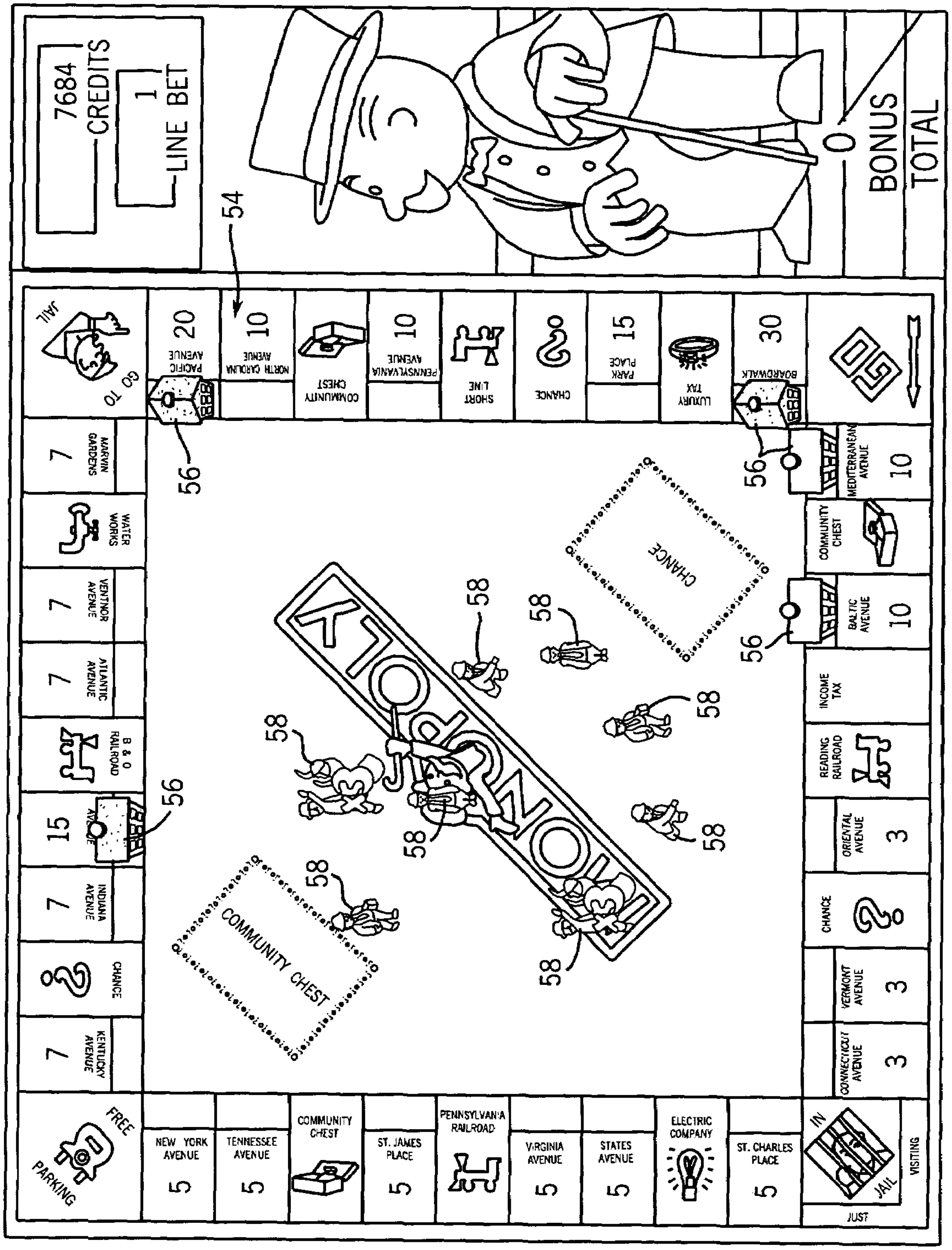

Referring to FIG. 9, the little guests 58 awarded in FIG. 5 start running to different destinations on the game board 54. The possible destinations include the forty spaces on the game board 54: 22 colored properties, four railroads, three Chance, three Community Chest, Electric Company, Water Works, Income Tax, Luxury Tax, Go, Jail, Free Parking, and Go to Jail. A "wealthy" couple counts as two guests but travels as one guest 58. The guests 58 may "break out" of the crowd in the middle of the game board 54 and run to the destinations one at a time (i.e., "solo-mode"), or two or more guests 58 may "break out" of the crowd and run to the destinations at the same time (i.e., "multi-mode"). More than one guest 58 can run to the same destination. In a preferred embodiment, multi-mode occurs near the beginning of the Tycoon Bonus feature, while solo-mode is reserved for the last few guests 58 (e.g., two to five guests) remaining in the middle of the game board 54. Further, couples preferably can only travel to colored properties.

The destinations provide the following awards when a guest 58 runs to that destination:

- A colored property that is undeveloped (i.e., without a hotel) awards that property's base value in credits. The base value is depicted on the property itself. The base values of the colored properties generally increase from color group to color group as you go clockwise around the Monopoly board, starting from Go. Baltic Avenue and Mediterranean Avenue are worth the least, while Boardwalk is worth the most. A couple going to a colored property without a hotel multiplies the property's base value by a multiplier such as three.

A colored property with a hotel awards that property's hotel value in credits. The hotel value is depicted on the property itself. A couple going to a colored property with a hotel multiplies the property's hotel value by a multiplier such as three.

"Go" awards all hotel values.

A "Railroad" awards three to five additional guests.

Figure 10:
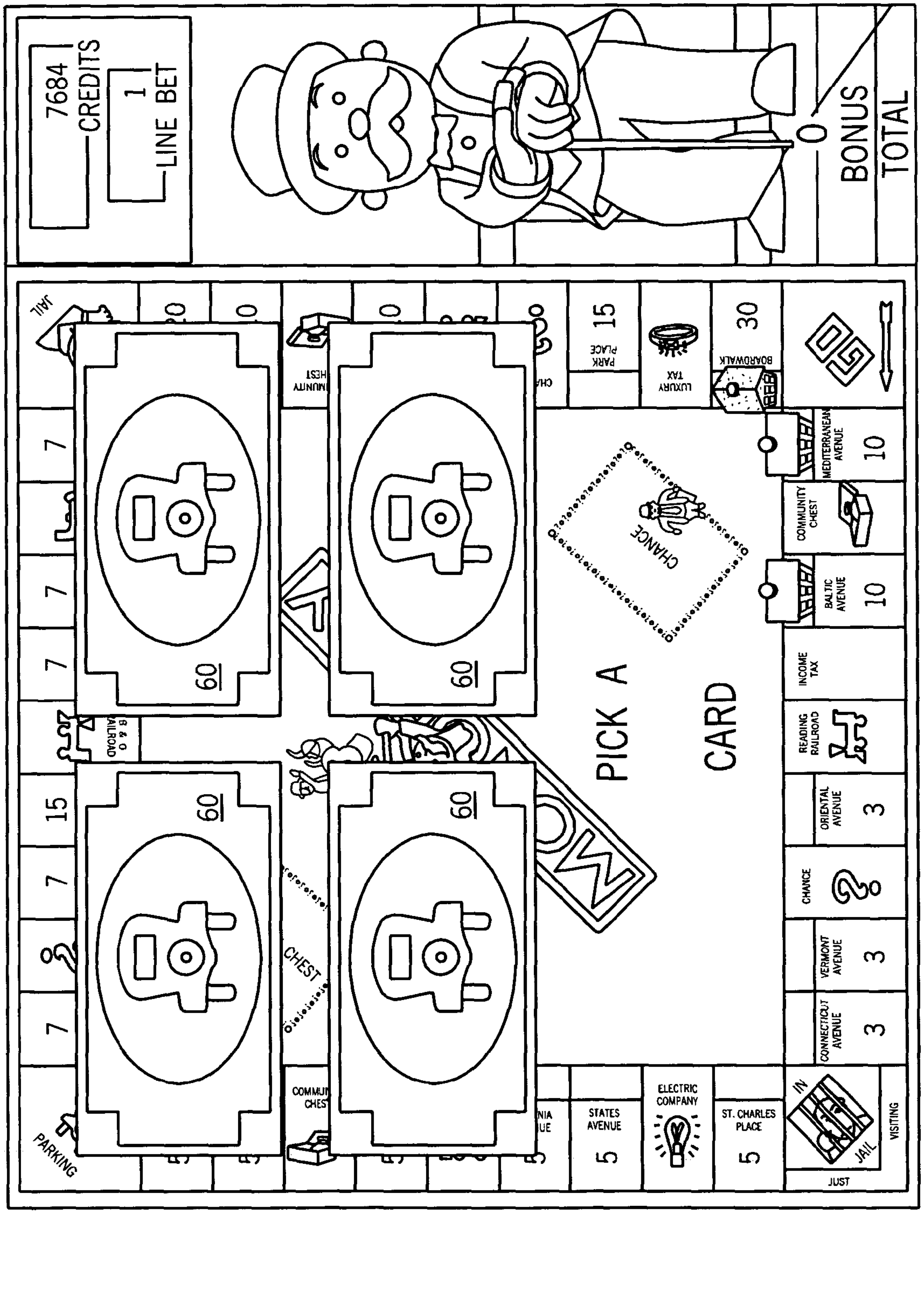
Figure 11:
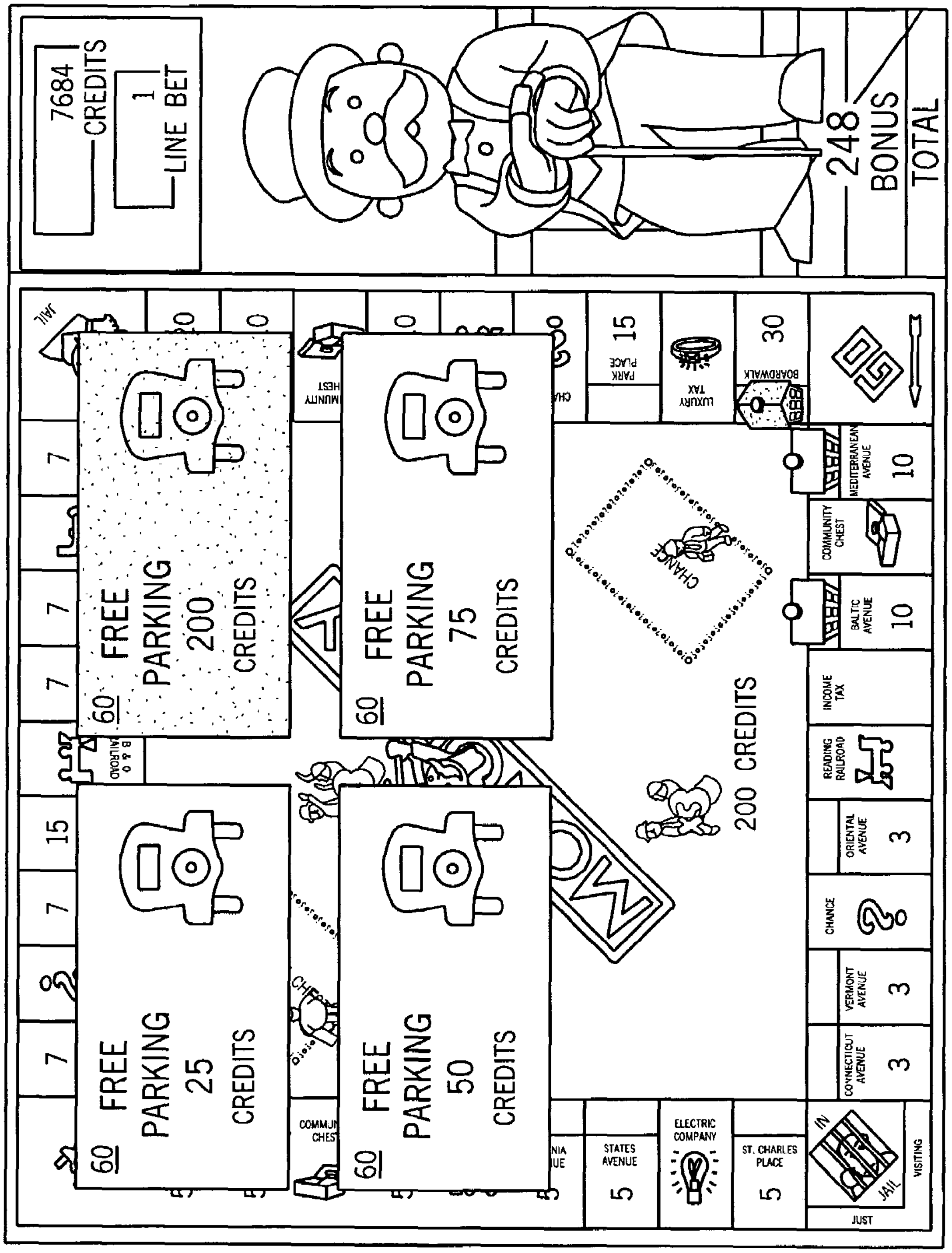

"Free Parking" makes four cards appear. The player is prompted to select one of the cards. The selected card awards a credit amount. An example is shown in FIGS. 10 and 11. In FIG. 10 the player is prompted to select one of the four cards 60. In FIG. 11 the selected card awards a credit amount of 200 credits. After the player selects one of the cards 60, the unselected cards also reveal the credit amounts that they would have awarded had the player selected one of those cards. The cards 60 are associated with respective credit amounts prior to the player's selection and remain associated with such respective credit amounts until all the cards are turned face up.

Figure 12:
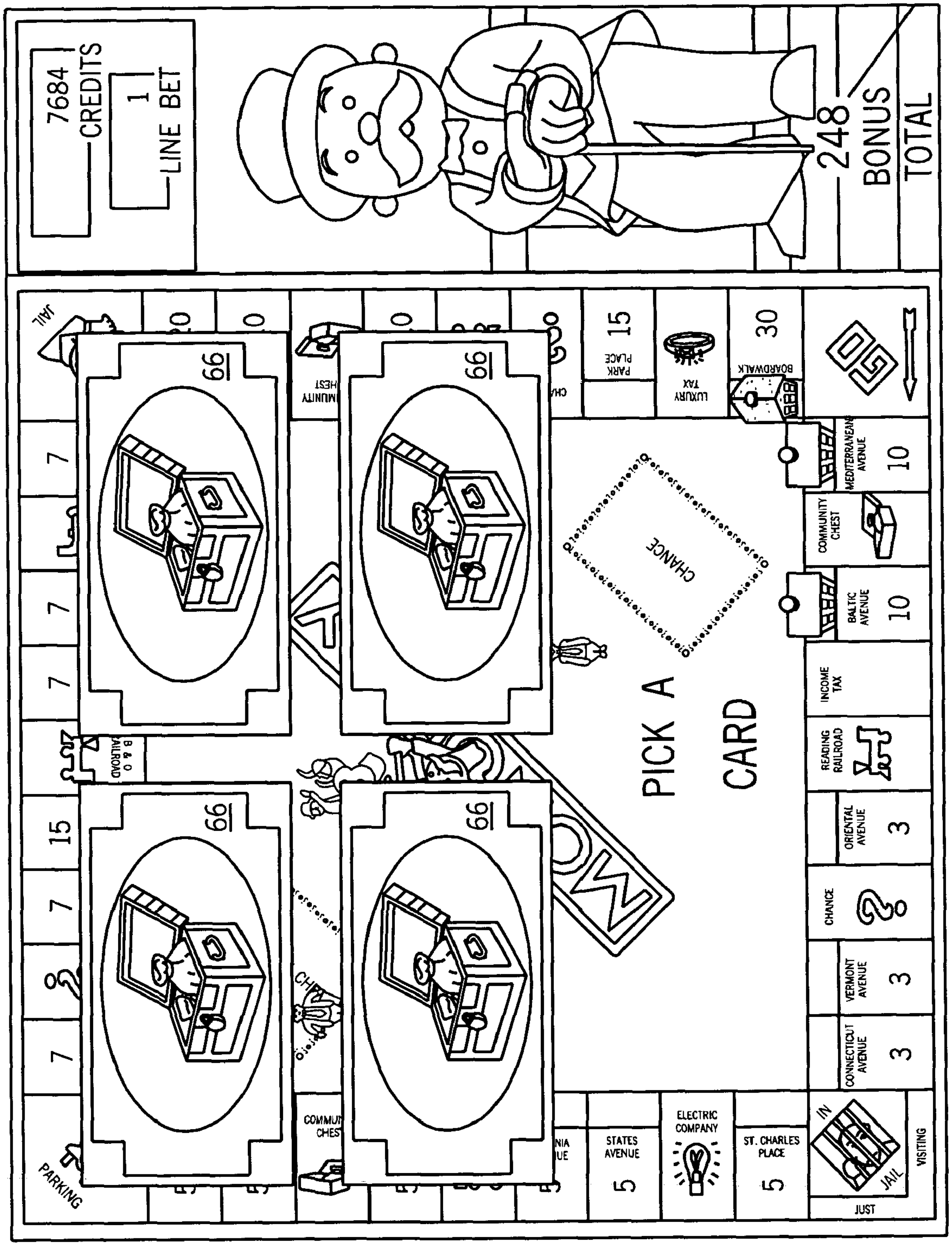
Figure 13:
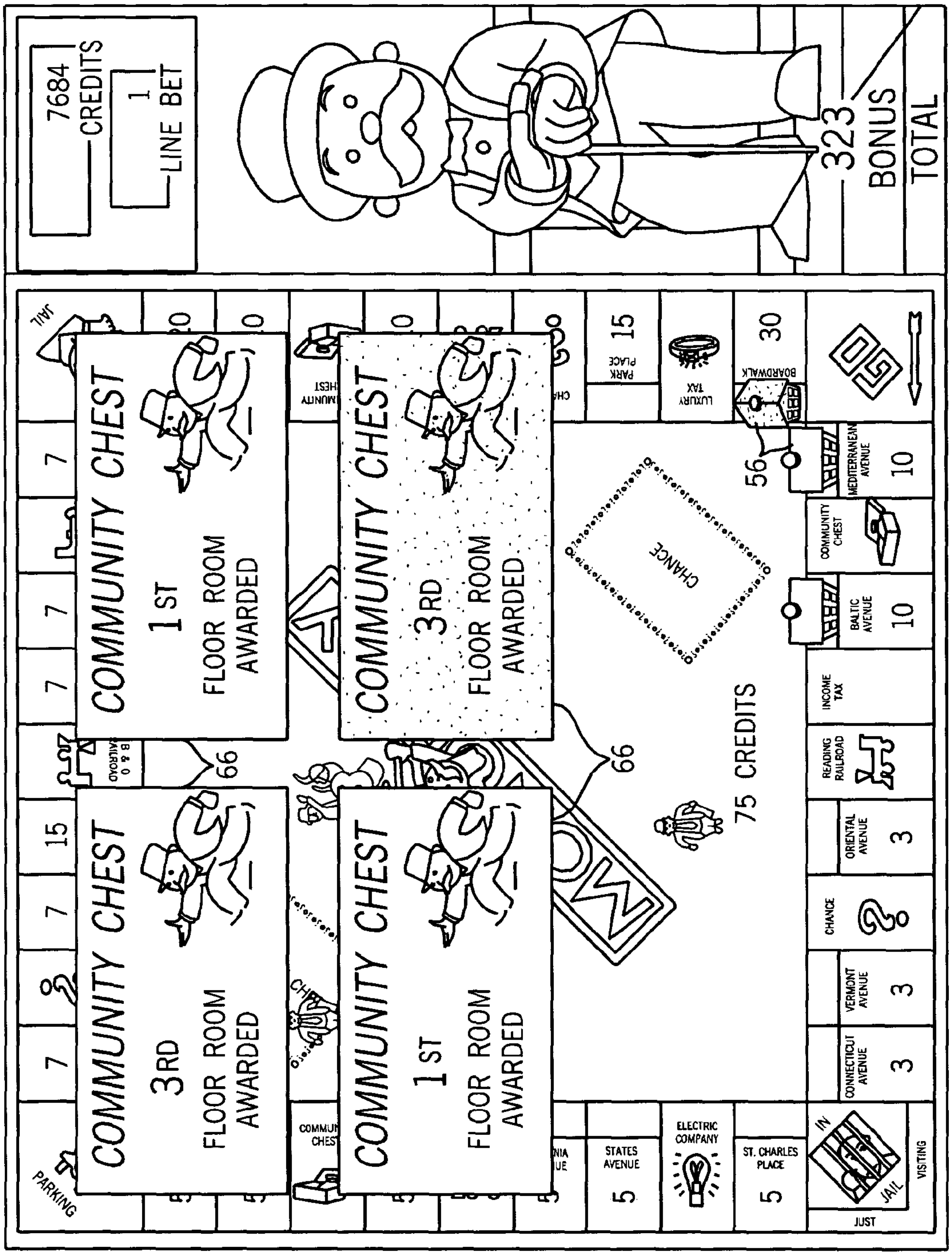

"Community Chest" makes four Community Chest cards appear. The player is prompted to select one of the cards. The selected card awards a hotel room on a given floor. In the top box display 13 (see FIG. 1), the hotel room lights on that floor 64 will light up and go out one by one, until only one is left. That hotel room is awarded. If the selected card awards a hotel room on any floor, all of the hotel room lights will light up and go out one by one, until only one is left. That hotel room is awarded. An example is shown in FIGS. 12 and 13. In FIG. 12 the player is prompted to select one of the four cards 66. In FIG. 13 the selected card awards a hotel room on the 3$^{rd}$ floor, which in turn awards a credit amount as described above. After the player selects one of the cards 66, the unselected cards also reveal the hotel rooms that they would have awarded had the player selected one of those cards. The cards 66 are associated with respective hotel rooms prior to the player's selection and remain associated with such respective hotel rooms until all the cards are turned face up.

Figure 14:
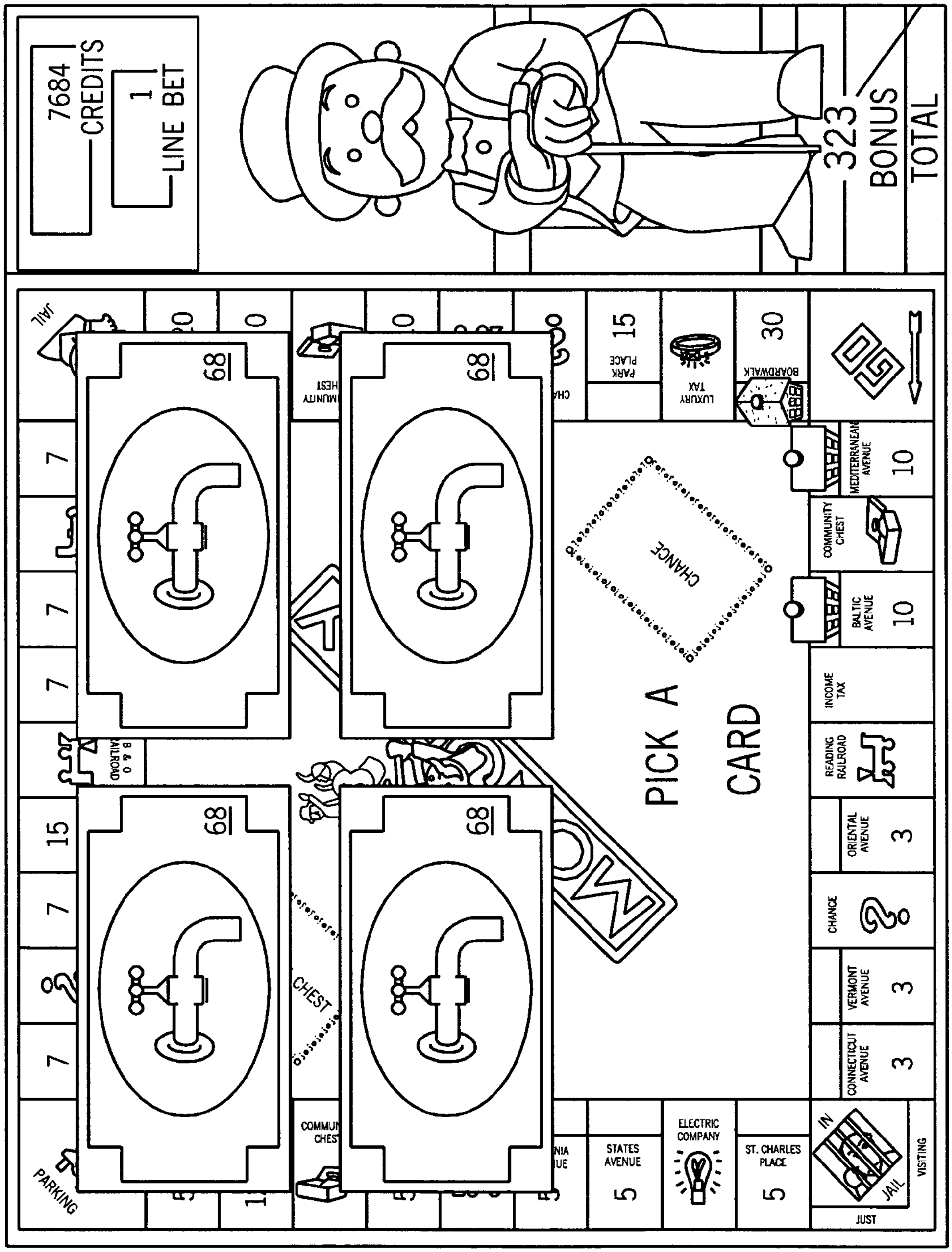
Figure 15:
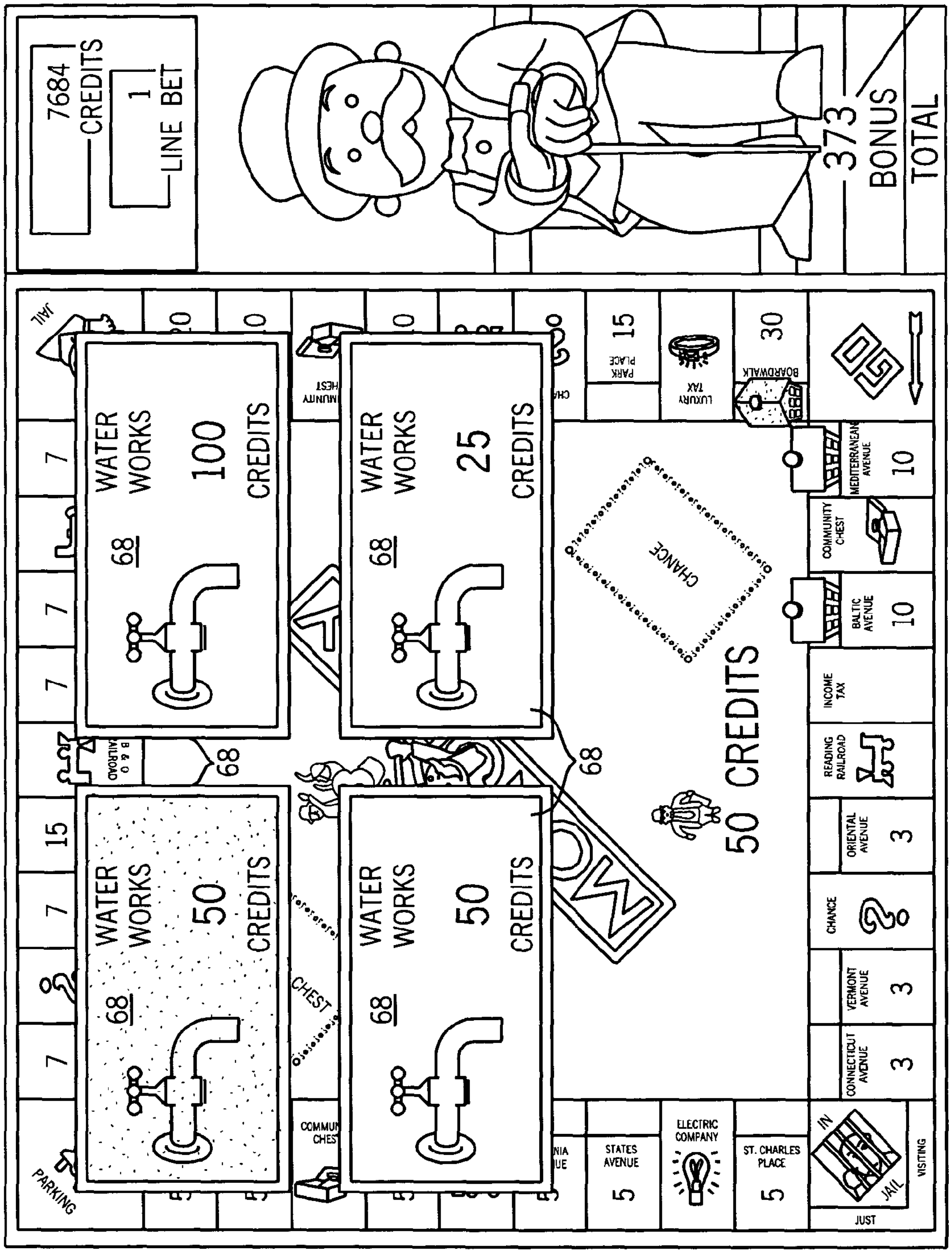

"Water Works" makes four cards appear. The player is prompted to select one of the cards. The selected card awards a credit amount. An example is shown in FIGS. 14 and 15. In FIG. 14 the player is prompted to select one of the four cards 68. In FIG. 15 the selected card awards a credit amount of 50 credits. After the player selects one of the cards 68, the unselected cards also reveal the credit amounts that they would have awarded had the player selected one of those cards. The cards 68 are associated with respective credit amounts prior to the player's selection and remain associated with such respective credit amounts until all the cards are turned face up.

Figure 16:
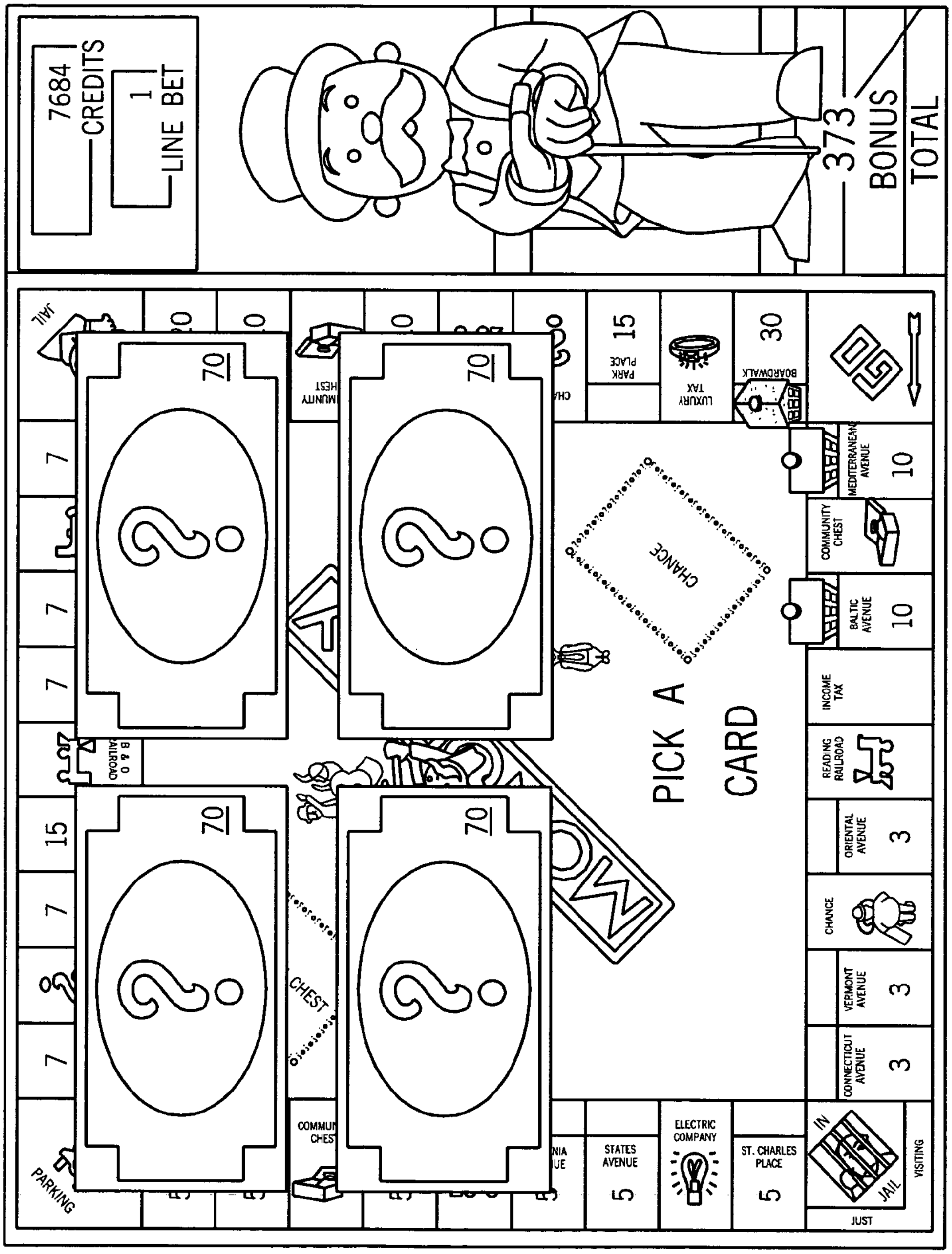
Figure 17:
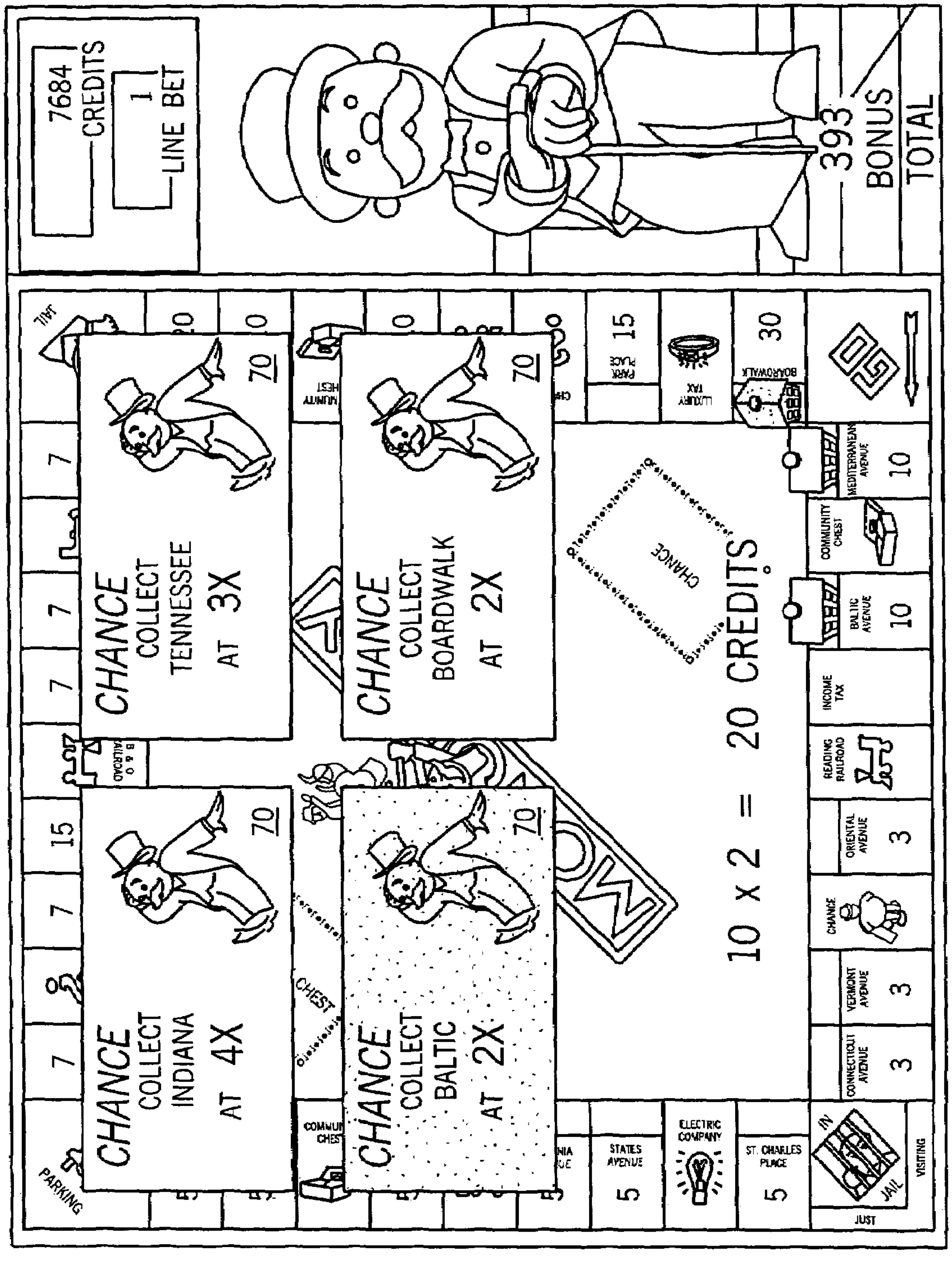

"Chance" makes four Chance cards appear. The player is prompted to select one of the cards. The selected card awards one of the properties with hotels at a 2×, 3×, or 4× multiplier. An example is shown in FIGS. 16 and 17. In FIG. 16 the player is prompted to select one of the four cards 70. In FIG. 17 the selected card awards Baltic Avenue (normally 10 credits) at a 2× multiplier, yielding a total award of 20 credits. After the player selects one of the cards 70, the unselected cards also reveal the properties/multipliers that they would have awarded had the player selected one of those cards. The cards 70 are associated with respective properties/multipliers prior to the player's selection and remain associated with such respective properties/multipliers until all the cards are turned face up.

"Electric Company" awards a hotel room in a manner similar to Community Chest. In the top box display 13 (see FIG. 1), all of the hotel room lights will light up and go out one by one, until only one is left. That hotel room is awarded.

The above examples likely would not all take place during the same occurrence of the Tycoon Bonus, but are sequentially shown in the figures for the sake of simplicity of illustration.

The CPU determines the destinations to which the guests 58 will go as follows. Prior to any of the guests 58 going to a destination, the CPU creates an ordered list of destinations. The CPU randomly selects the destinations to be included in the ordered list. The destinations selected for inclusion in the ordered list may be weighted equally or unequally during the selection process. The number of destinations in the ordered list is at least as great as the maximum number of guests 58 that can appear during the Tycoon Bonus (including any extra guests that may result from a guest going to one of the four Railroads, as discussed above). The same destination may appear more than once in the ordered list such that more than one guest 58 can go to the same destination. Starting from the top of the ordered list, each guest 58 that breaks out of the middle of the game board 54 goes to the next destination in the ordered list.

Figure 18:
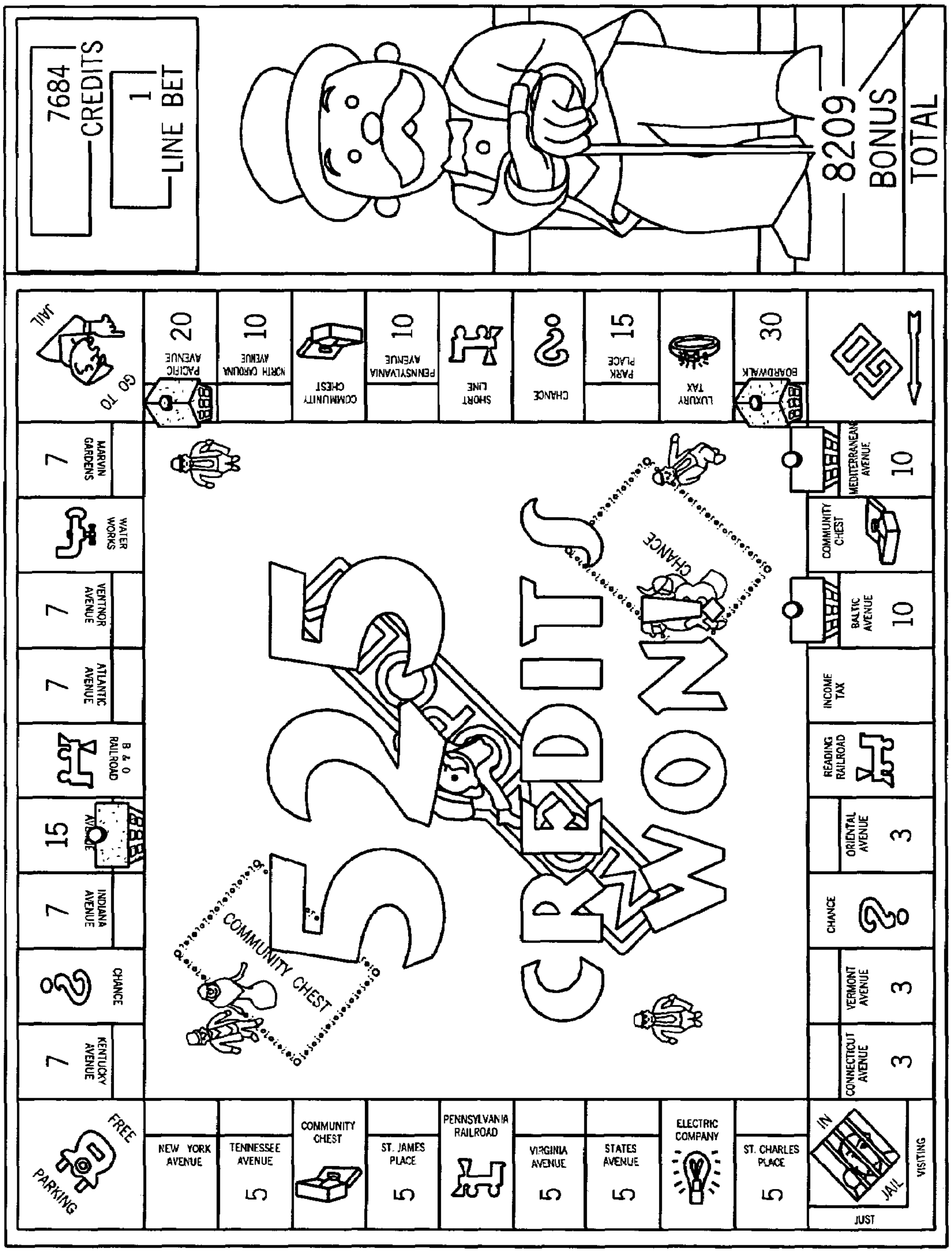

When all of the guests 58 (see FIG. 9) have gone to their destinations, the Tycoon Bonus is over. As depicted in FIG. 18, the display shows the total number of credits won in the Tycoon Bonus. The CPU then shifts operation from the Tycoon Bonus back to the basic slot game.

In accordance with the present invention, the Tycoon Bonus is based on a game program that simulates artificial intelligence by creating objects that are ostensibly the same but in fact behave as if there is some intelligence, personality, and motivation driving their behavior. The objects are preferably characters (e.g., guests 58) that are initially part of a crowd in the middle of the game board 54.

When a guest 58 stands in the crowd in the middle of the game board 54 as in FIG. 9, the guest 58 engages in idle behavior primarily intended to entertain a player of the gaming machine. The idle behavior is unrelated to any destination to which the guest 58 may later go. To determine how each guest 58 in the crowd will behave during the idle moments, each guest 58 is randomly assigned a number. The number defines the behavior type for that guest 58 as each selected property in FIGS. 6-8 receives a hotel. For example, a guest 58 of behavior type 1 could exhibit the following sequence of behaviors:

stretch when the first hotel appears, look around when the third hotel appears, and jump excitedly when the fifth hotel appears.

A guest 58 of behavior type 2 could exhibit the following sequence of behaviors:

wait quietly before the second hotel appears, rock back and forth when the second hotel appears, and start dancing when the fourth hotel appears.

A guest 58 of behavior type 3 could exhibit the following sequence of behaviors:

alternate between waiting and looking around before the first hotel appears, check his/her watch when the first hotel appears, stretch when the third hotel appears, and go up into a handstand, dance, and then run when the fifth hotel appears.

In the preferred embodiment, there are a total of twenty behavior types that can be randomly assigned to the guests 58. Some possible idle behaviors may include the following isolated actions of a guest (acting alone): waiting, stretching, setting down and picking up a suitcase, rocking back and forth, checking a wristwatch, looking around, dancing, exciting jumping, doing a handstand, spinning, etc. Other possible idle behaviors may include the following interactions between two or more guests: shaking hands, talking and listening, excited talking and excited listening, giving a high five, dancing, etc. The game program loops a guest through the sequence of behaviors defined by the assigned behavior type.

When a guest 58 breaks out of the middle of the game board 54 and runs to a selected destination, the guest 58 engages in a run pattern behavior primarily intended to heighten the level of excitement, anticipation, and suspense. The run pattern behavior is defined by two linked tables. Table 1 defines the possible run patterns or maneuvers: decisive, indecisive, fake jump, etc.

TABLE I

POSSIBLE RUN PATTERNS

| Title | Full Title | Guest Run Pattern |
|---|---|---|
| Dec | Decisive | Goes to destination property, jumps in. |
| IndSide | Indecisive - side of board | Goes near destination property, looks about, jumps in. |
| IndCor | Indecisive - corner of board | Goes near destination property, looks about, turns 90 degrees, looks about, jumps in. |
| SupInd | Super Indecisive | Goes to x-property 90 degrees away, looks, goes to destination property, looks, jumps in. |
| MegInd | Mega Indecisive | Goes to x-property 90 degrees away, looks, goes to x-property 90 degrees away from that, looks, goes to destination property. |
| FkJump | Fake jump | Goes straight to x-property, fakes jump, stops, turns to face destination property, runs straight to destination property, goes in. |
| Fake1 | Neighbor fake | Goes straight to x-property next to destination property, fakes jump, runs next door, jumps in. |
| Fake2 | Neighbor double fake | Goes straight to x-property two away from destination property, fakes jump, goes straight to x-property next to destination property. |
| FkFake | Fake Fake | Goes straight to property, fakes jump, stops, jumps in. |
| Watch | Watch | Walks around board half way, looks at watch, runs to destination property, jumps in. |

Table II is a weighted table that provides, for a given destination, the probabilities that a guest 58 will exhibit different ones of the run patterns noted in Table I. The destination determines the possible run patterns of the guest 58 going to that destination and the probability of exhibiting each of the run patterns. For example, a guest 58 going to a lower-paying, more mundane destination such as Vermont Avenue is more likely to (but not always) go directly to the destination and follow a decisive path; however, a guest 58 going to a higher-paying, more exciting destination such as Boardwalk is more likely to (but not always) go indirectly to the destination and follow an indecisive path, e.g., look around, fake a jump, and then continue along. Thus, while higher-paying destinations will more likely use tricky and evasive maneuvers than lower-paying destinations, there is still an element of randomness in Table II that makes the maneuvering unpredictable.

In the preferred embodiment, a guest's possible run patterns and probability of exhibiting each of the run patterns are dependent upon the guest's destination. In an alternative embodiment, a guest's possible run patterns and probability of exhibiting each of the run patterns may be tied to the guest instead of the destination, such that the possible run patterns and the probabilities are independent of the guest's destination.

TABLE II

RUN PATTERN PROBABILITY BY DESTINATION

| Property | Dec | IndSide | IndCor | SupInd | MegInd | Fake1 | Fake2 | FkFake | FkJump | Watch |
|---|---|---|---|---|---|---|---|---|---|---|
| Vermont | 45 | 0 | 5 | 1 | 2 | 15 | 10 | 10 | 10 | 2 |
| Boardwalk | 5 | 0 | 5 | 6 | 2 | 20 | 20 | 20 | 20 | 2 |
| Electric Company | 5 | 0 | 20 | 10 | 5 | 25 | 13 | 10 | 10 | 2 |
| Railroad | 5 | 25 | 0 | 10 | 2 | 10 | 8 | 10 | 10 | 20 |

etc. for all possible destinations on the board

Figure 19:
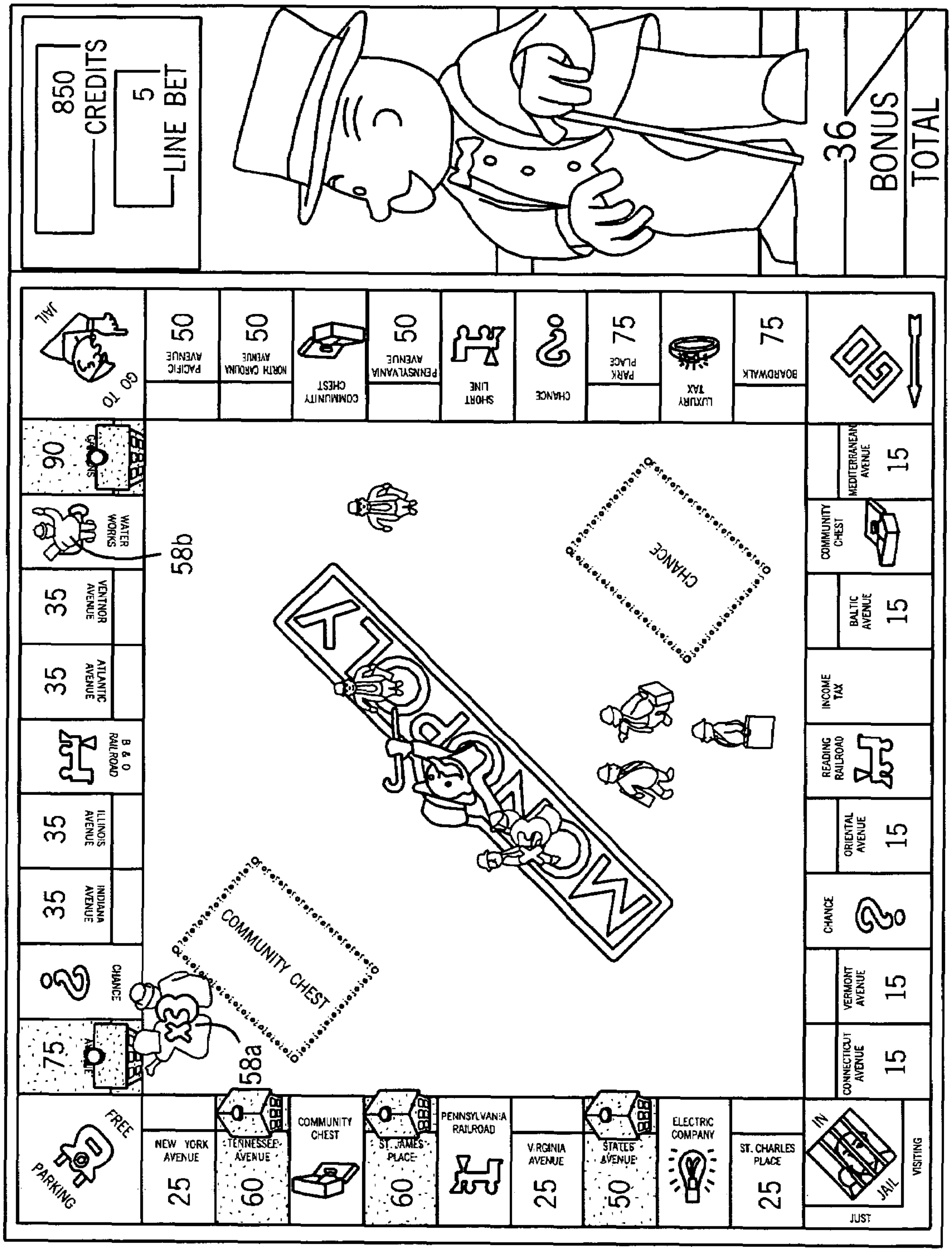
Figure 20:
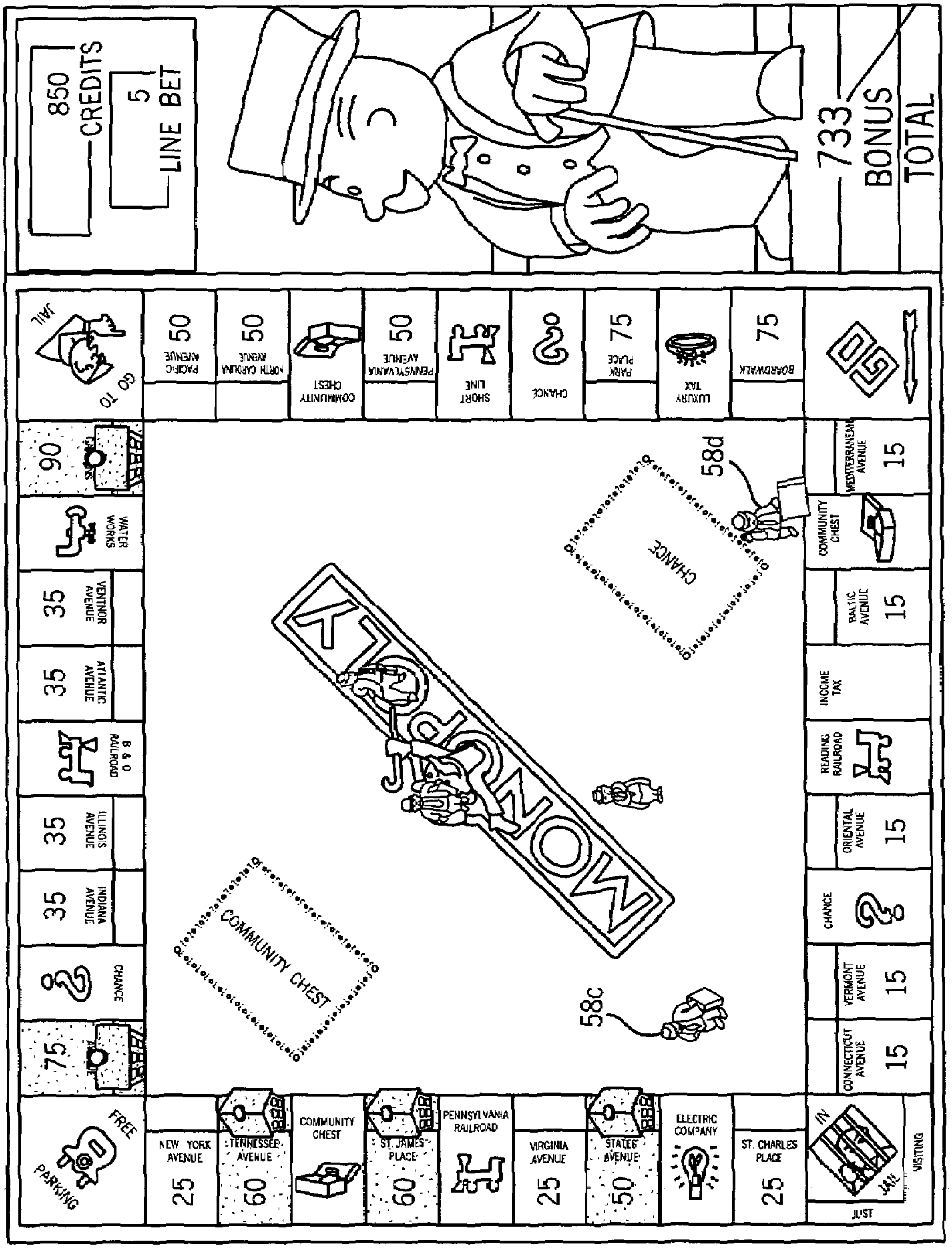
Figure 21:
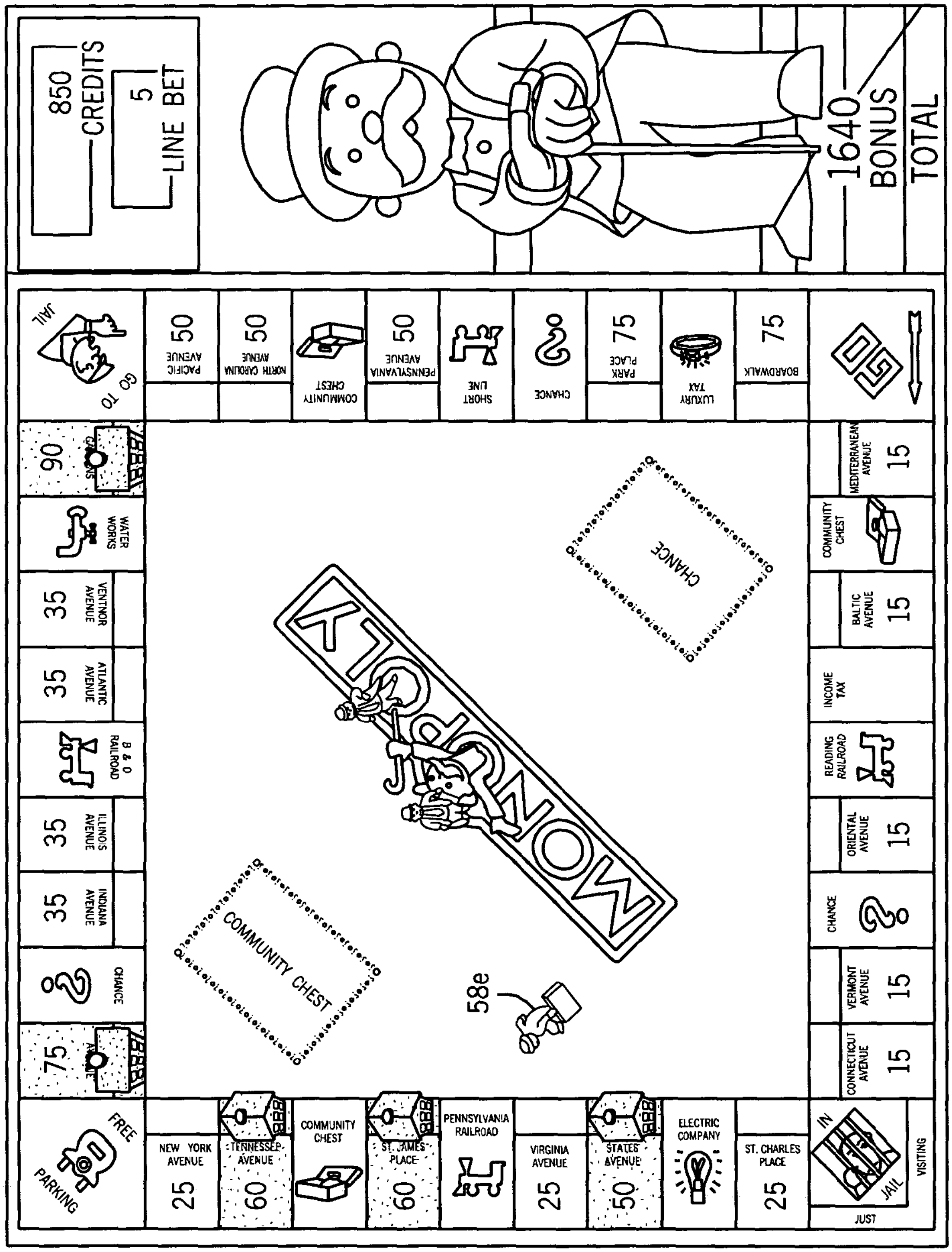
Figure 22:
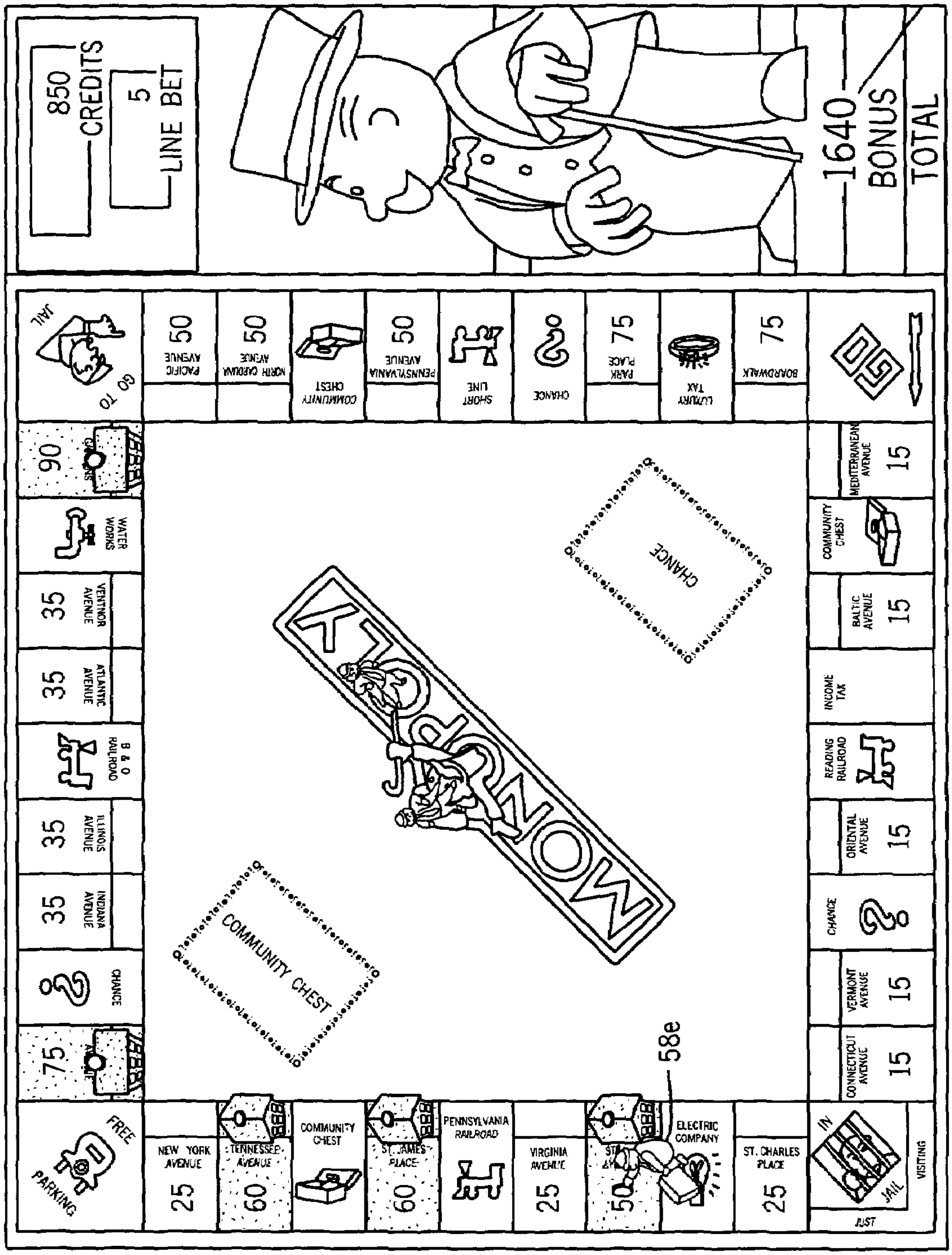
Figure 23:
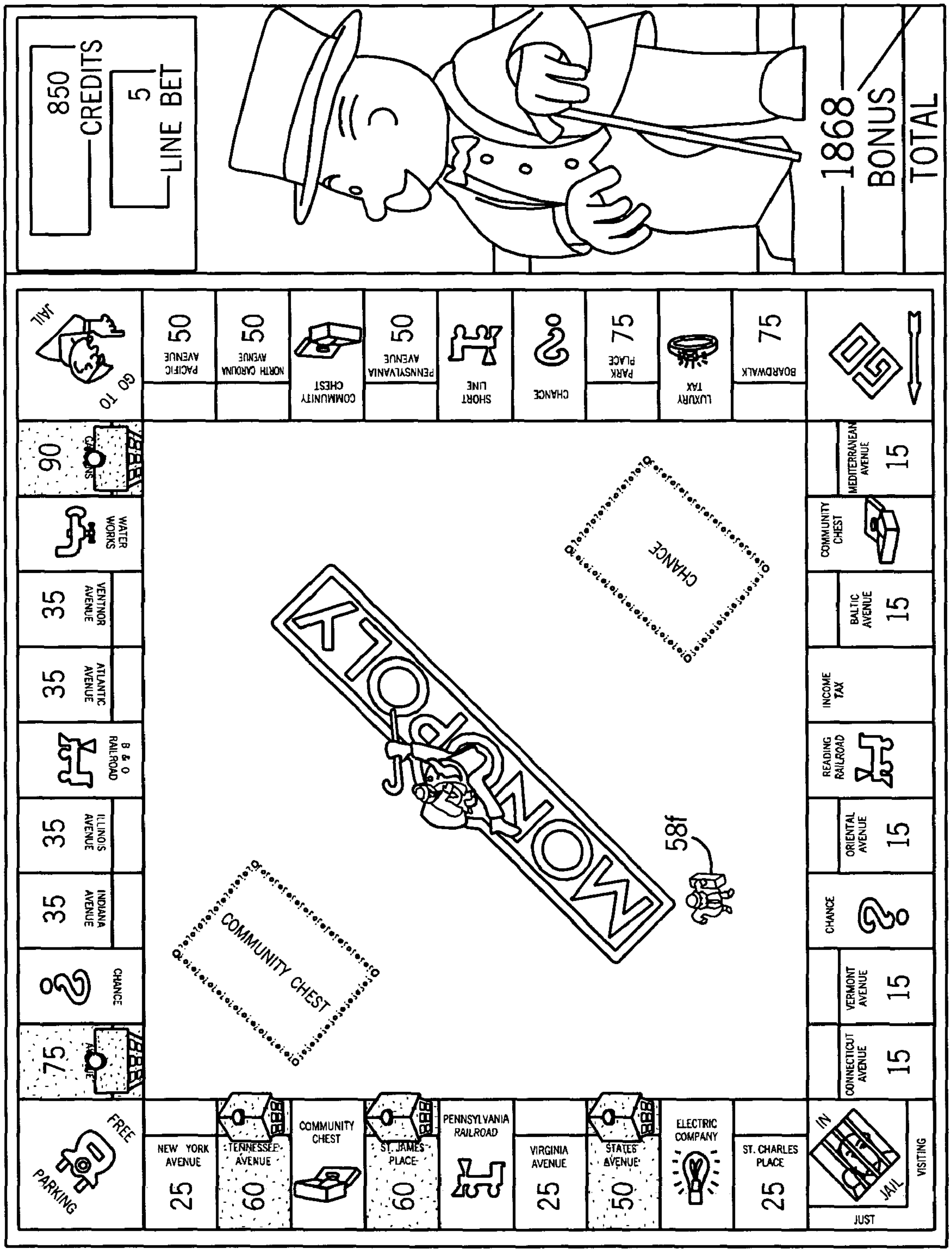
Figure 24:
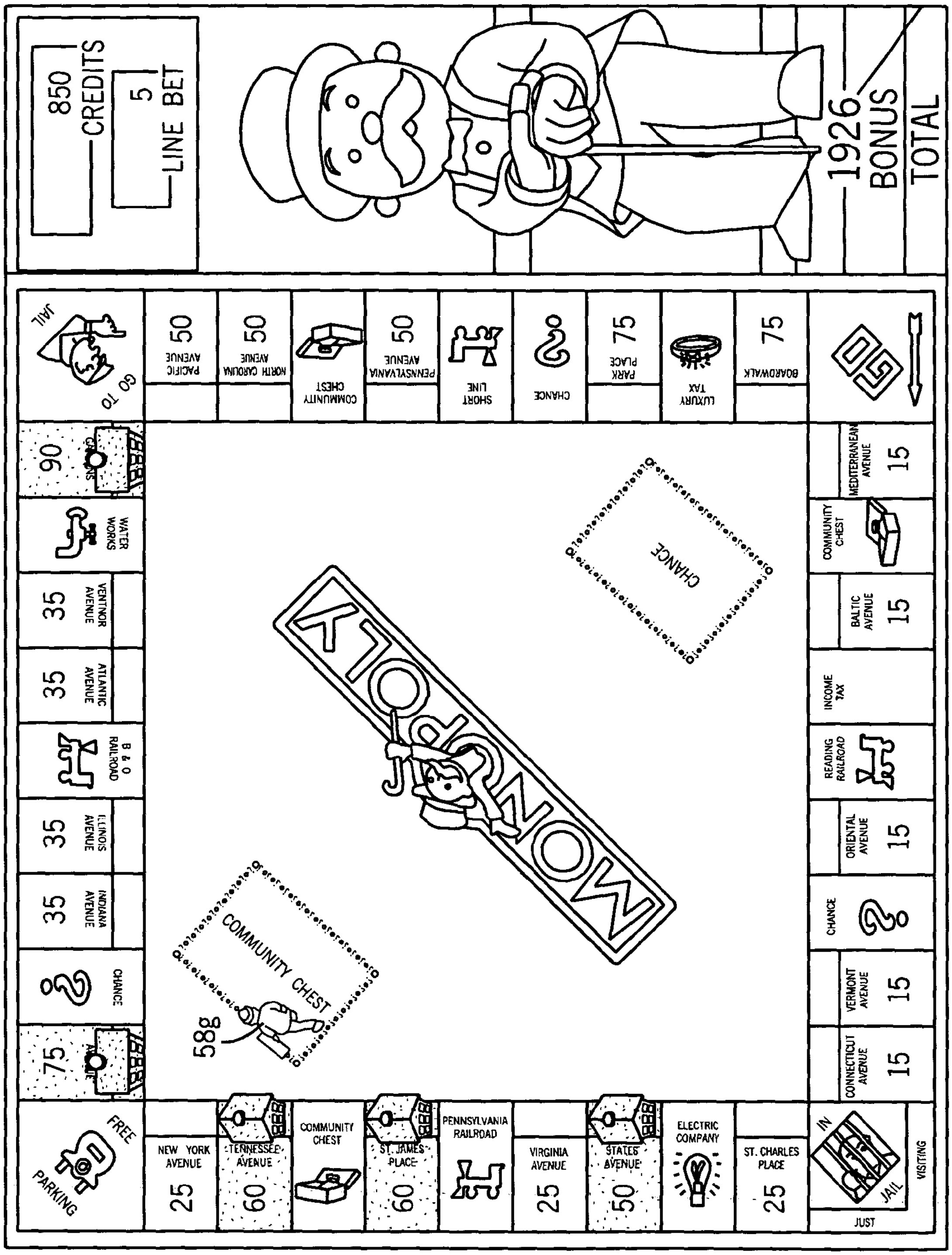

FIGS. 19-24 are display images (albeit still shots) of the guests 58 engaged in some of the above-noted run pattern behaviors. FIG. 19 depicts a rich couple 58*a* looking around while a single guest 58*b* jumps to Water Works. FIG. 20 depicts a single guest 58*c* looking about while a single guest 58*d* jumps to Community Chest. FIG. 21 depicts a single guest 58*e* faking a jump to Virginia Avenue. FIG. 22 depicts the same guest 58*e* jumping to Electric Company. FIG. 23 depicts a single guest 58*f* stopped in a waiting pattern in front of Chance. FIG. 24 depicts a single guest 58*g* moving indecisively around the board.

While the present invention has been described with reference to one or more particular embodiments, those skilled in the art will recognize that many changes may be made thereto without departing from the spirit and scope of the present invention.

For example, instead of having the destinations on the game board 54 define the awards to be given to a player, the destinations could be eliminated so that the idle behaviors and/or the run pattern behaviors of the guests 58 in and of itself define the awards. For example, an idle behavior of dancing could represent a larger award than an idle behavior of stretching.

Further, a simulated intelligence feature akin to the Tycoon Bonus could be implemented in other wagering games, such as video poker, video keno, video blackjack, etc. The feature could be implemented as part of a base game or a bonus game.

Each of these embodiments and obvious variations thereof is contemplated as falling within the spirit and scope of the claimed invention, which is set forth in the following claims.

What is claimed is:

1. A method of conducting a wagering game, comprising:

receiving a wager to play the wagering game;

displaying a plurality of movable objects;

displaying a plurality of possible destinations to which the moveable objects are movable;

defining a plurality of possible different movement patterns for moving the objects to the destinations, the movement patterns including direct movement patterns and evasive movement patterns;

for a given one of the objects, assigning probabilities to the respective possible movement patterns;

for the given one of the objects, randomly selecting a destination from the plurality of destinations and, after the destination has been selected, selecting one of the possible movement patterns based on the assigned probabilities; and displaying the plurality of objects simultaneously moving to the plurality of possible destinations in accordance with the respective selected movement patterns, the combination of each moveable object and the associated destination to which the moveable object moves indicating a certain payout award.

2. The method of claim 1, wherein the assigned probabilities for the movement patterns for the selected destination are different.

3. The method of claim 1, wherein the randomly selected destination and the movement of the object to the randomly selected destination occur without any player input.

4. A method of conducting a wagering game, comprising:

receiving a wager to play the wagering game;

displaying a plurality of possible outcomes associated with respective payouts;

randomly selecting one or more of the possible outcomes;

displaying a plurality of characters that are ostensibly similar, each character being movable to a respective randomly selected outcome;

assigning to each character at least one of a plurality of possible different behaviors depending upon the respective randomly selected outcome, the plurality of different behaviors providing a simulated intelligence to the movable characters;

moving the plurality of characters to the respective randomly selected outcomes;

while the moveable characters are moving to the respective randomly selected outcomes, displaying the behaviors assigned to the respective characters such that the characters exhibit the simulated intelligence while moving; and awarding the payouts associated with the respective randomly selected outcomes to which the characters move.

5. The method of claim 4, wherein each randomly selected outcome is associated with one or more of the possible behaviors.

6. The method of claim 4, wherein for each character, the assigning includes assigning different probabilities to the possible different behaviors depending upon the randomly selected outcome for that character such that the randomly selected outcome determines the assigned probabilities, and assigning the at least one of the plurality of possible different behaviors to the character based on the assigned probabilities.

7. The method of claim 4, wherein the moving is along a path that includes a starting point and a destination associated with the randomly selected outcome, the path being independent of player input.

8. The method of claim 4, wherein the plurality of possible behaviors include a plurality of evasive movement patterns by which one of the characters moves to its respective selected outcome along an indirect path.

9. The method of claim 4, wherein the plurality of possible outcomes are respective possible destinations.

10. The method of claim 4, wherein the moving is free of control of a player of the wagering game.

11. A method of conducting a wagering game, comprising:

receiving a wager to play the wagering game;

randomly selecting a plurality of outcomes;

defining a plurality of movable objects;

associating with each object at least one of the plurality of outcomes;

assigning to each object at least one of a plurality of possible first behaviors unrelated to the associated outcome,the assigning to each object at least one of a plurality of possible second behaviors includes assigning different probabilities to the possible second behaviors depending upon the associated outcome for that object; and moving the moveable objects and displaying the first and second behaviors assigned to the objects.

12. The method of claim 11, wherein the plurality of possible first behaviors are idle behaviors.

13. The method of claim 12, wherein the idle behavior for each object occurs before the moving of that object.

14. The method of claim 11, wherein the plurality of outcomes are destinations, and wherein the plurality of possible second behaviors include a plurality of movement patterns for moving the objects to the associated destinations.

15. The method of claim 11, wherein the plurality of outcomes are associated with respective payouts and further including displaying the payouts for the plurality of outcomes.

16. The method of claim 11, wherein the movable objects are characters and the at least one of the first and second behaviors cause the characters to behave with simulated intelligence as the characters move to the randomly selected outcomes.

17. The method of claim 11, wherein the movement of each object is along a path that includes a starting point and a destination associated with the randomly selected outcome, the path being independent of player input.

18. The method of claim 14, wherein the plurality of movement patterns including one or more evasive movement patterns for moving an object to its associated destination along an indirect path.

19. A gaming apparatus for conducting a wagering game, comprising:

a value input device for receiving a wager to play the wagering game;

a display; and a processor coupled to the display and operative to cause the display to display a plurality of possible outcomes associated with respective payouts, one or more of the plurality of possible outcomes being randomly selected outcomes, cause the display to display a plurality of characters that are ostensibly similar, each character being movable to a respective randomly selected outcome, assign to each character at least one of a plurality of possible different behaviors depending upon the respective randomly selected outcome, wherein for each character the assignment of possible different behaviors is based on probabilities associated with a randomly selected outcome for that character such that the randomly outcome determines the assigned probabilities, the assignment of the at least one of the plurality of possible different behaviors to the characters is based on the assigned probabilities, while the moveable characters are moving to the respective randomly selected outcomes, cause the display to display the behaviors assigned to the respective characters such that the characters move and behave with simulated intelligence as the characters move to the randomly selected outcomes, and award the payouts associated with the respective randomly selected outcomes to which the characters move.

20. The apparatus of claim 19, wherein each randomly selected outcome is associated with one or more of the possible behaviors.

21. The apparatus of claim 19, wherein the assigned probabilities for at least two of the randomly selected outcomes are different.

22. The apparatus of claim 19, wherein the plurality of possible behaviors include a plurality of evasive movement patterns by which one of the characters moves to the respective selected outcome along an indirect path.

23. The apparatus of claim 19, wherein the plurality of possible outcomes are respective possible destinations displayed on the display.

24. The apparatus of claim 19, wherein the movement of characters is free of control of a player of the wagering game.

25. The apparatus of claim 19, wherein the processor is operative to determine the randomly selected outcomes.

26. The apparatus of claim 25, wherein the randomly selected outcomes are destinations displayed on the display.

27. The apparatus of claim 19, wherein the movement of each character is along a path that includes a starting point and a destination associated with the randomly selected outcome, the path being independent of player input.

28. The apparatus of claim 27, wherein the characters simultaneously move along their respective paths.

29. A method of conducting a wagering game, comprising:

receiving a wager to play the wagering game;

displaying a plurality of movable characters;

displaying a plurality of possible destinations to which the moveable characters are movable;

defining a plurality of possible different movement patterns for moving the characters to the destinations, the movement patterns including direct movement patterns and evasive movement patterns that allow the character to exhibit a simulated intelligence;

for a given one of the characters, assigning probabilities to the respective possible movement patterns;

for the given one of the characters, randomly selecting a destination from the plurality of destinations and, after the destination has been selected, selecting one of the possible movement patterns based on the assigned probabilities; and displaying the plurality of characters moving to the plurality of possible destinations in accordance with the respective selected movement patterns such that the characters exhibit the simulated intelligence while moving, the combination of each moveable character and the associated destination to which the moveable character moves indicating a certain payout award.

30. The method of claim 29, wherein the randomly selected destination and the movement of the character to the randomly selected destination occur without any player input.

31. The method of claim 29, wherein the displaying the plurality of characters moving to the plurality of possible destinations includes displaying the plurality of characters simultaneously moving to the plurality of possible destinations.

* * * * *